US012661800B2

(12) United States Patent
Ye et al.

(10) Patent No.: US 12,661,800 B2
(45) Date of Patent: Jun. 23, 2026

(54) ROBOT AND METHOD FOR CONTROLLING THEREOF

(71) Applicant: SAMSUNG ELECTRONICS CO., LTD., Suwon-si (KR)

(72) Inventors: Donghee Ye, Suwon-si (KR); Koeun Choi, Suwon-si (KR); Boseok Moon, Suwon-si (KR); Jungku Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/657,415

(22) Filed: May 7, 2024

(65) Prior Publication Data

US 2024/0424680 A1     Dec. 26, 2024

Related U.S. Application Data

(63) Continuation of application No. PCT/KR2024/003231, filed on Mar. 13, 2024.

(30) Foreign Application Priority Data

Jun. 26, 2023    (KR) ........................ 10-2023-0082088

(51) Int. Cl.
    *B25J 9/16*       (2006.01)
    *B25J 11/00*      (2006.01)
    *B25J 19/02*      (2006.01)
(52) U.S. Cl.
    CPC ......... *B25J 9/1697* (2013.01); *B25J 11/0005* (2013.01); *B25J 19/026* (2013.01)

(58) Field of Classification Search
    CPC ..... B25J 9/1697; B25J 11/0005; B25J 19/026
    See application file for complete search history.

(56) References Cited

U.S. PATENT DOCUMENTS 10,596,708 B2     3/2020   Park et al.
11,148,296 B2    10/2021   Breazeal
                 (Continued)

FOREIGN PATENT DOCUMENTS

JP       2007-130691  A      5/2007
JP           4815940  B2    11/2011
                 (Continued)

OTHER PUBLICATIONS

International Search Report (PCT/ISA/210) issued on Jun. 14, 2024 by the International Searching Authority in International Patent Application No. PCT/KR2024/003231.
                 (Continued)

*Primary Examiner* — Dylan M Katz
(74) *Attorney, Agent, or Firm* — Sughrue Mion, PLLC

(57)                ABSTRACT
A robot and a controlling method thereof are provided. The robot includes: a camera; a driver; at least one memory storing instructions; and at least one processor operatively connected to the at least one memory. The at least one processor may be configured to execute the instructions to: recognize at least one user located around the robot based on an image acquired through the camera; identify a first rotation angle and a first rotation direction of the robot based on a location of at least one target region in which the at least one user is located among a plurality of regions within a field angle of the camera and a first gaze order for the at least one target region; and control the driver to rotate the robot based on the first rotation angle and the first rotation direction.

20 Claims, 18 Drawing Sheets

(56)                    References Cited

U.S. PATENT DOCUMENTS

| | | | |
|---|---|---|---|
| 11,285,611 B2 | 3/2022 | Park et al. | |
| 2020/0122333 A1 | 4/2020 | Park et al. | |
| 2020/0341480 A1* | 10/2020 | Jung | G05D 1/0223 |
| 2023/0173683 A1 | 6/2023 | Gomez | |
| 2023/0219233 A1 | 7/2023 | Han et al. | |

FOREIGN PATENT DOCUMENTS

| | | |
|---|---|---|
| JP | 5751610 B2 | 7/2015 |
| JP | 2015-171737 A | 10/2015 |
| JP | 5948359 B2 | 7/2016 |
| JP | 6203696 B2 | 9/2017 |
| JP | 6972526 B2 | 11/2021 |
| KR | 10-2228866 B1 | 3/2021 |
| KR | 10-2021-0156169 A | 12/2021 |
| KR | 10-2022-0083100 A | 6/2022 |
| KR | 10-2023-0077097 A | 6/2023 |

OTHER PUBLICATIONS

Written Opinion (PCT/ISA/237) issued on Jun. 14, 2024 by the International Searching Authority in International Patent Application No. PCT/KR2024/003231.
Duque-Domingo, Jaime et al., "Gaze Control of a Robotic Head for Realistic Interaction With Humans", Frontiers in Neurorobotics, Jun. 17, 2020, vol. 14, Article 34, XP093341181. (19 pages total).
Communication issued Jan. 22, 2026 by the European Patent Office in European Patent Application No. 24832178.8.

\* cited by examiner

FIG. 3

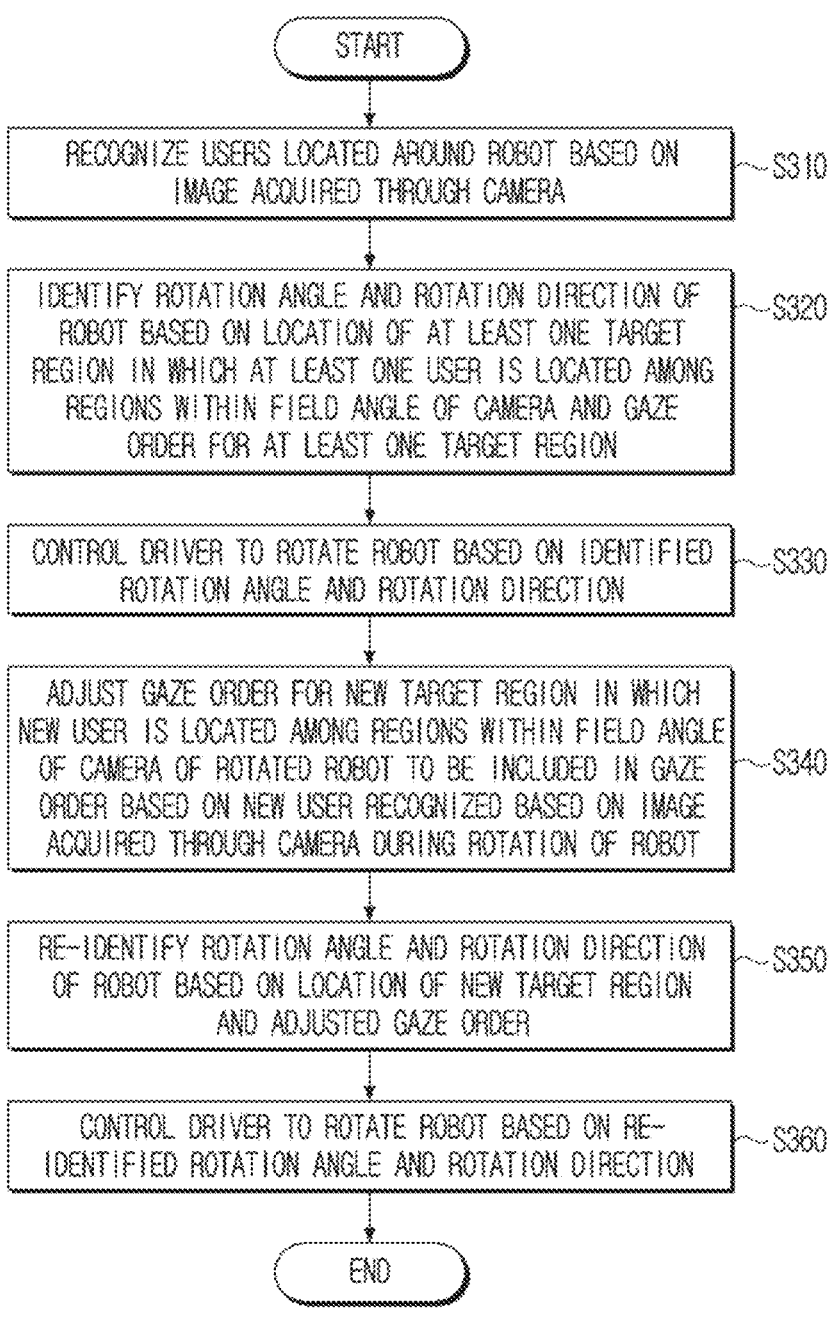

START

RECOGNIZE USERS LOCATED AROUND ROBOT BASED ON IMAGE ACQUIRED THROUGH CAMERA ~S310

IDENTIFY ROTATION ANGLE AND ROTATION DIRECTION OF ROBOT BASED ON LOCATION OF AT LEAST ONE TARGET REGION IN WHICH AT LEAST ONE USER IS LOCATED AMONG REGIONS WITHIN FIELD ANGLE OF CAMERA AND GAZE ORDER FOR AT LEAST ONE TARGET REGION ~S320

CONTROL DRIVER TO ROTATE ROBOT BASED ON IDENTIFIED ROTATION ANGLE AND ROTATION DIRECTION ~S330

ADJUST GAZE ORDER FOR NEW TARGET REGION IN WHICH NEW USER IS LOCATED AMONG REGIONS WITHIN FIELD ANGLE OF CAMERA OF ROTATED ROBOT TO BE INCLUDED IN GAZE ORDER BASED ON NEW USER RECOGNIZED BASED ON IMAGE ACQUIRED THROUGH CAMERA DURING ROTATION OF ROBOT ~S340

RE-IDENTIFY ROTATION ANGLE AND ROTATION DIRECTION OF ROBOT BASED ON LOCATION OF NEW TARGET REGION AND ADJUSTED GAZE ORDER ~S350

CONTROL DRIVER TO ROTATE ROBOT BASED ON RE-IDENTIFIED ROTATION ANGLE AND ROTATION DIRECTION ~S360

END

FIG. 5
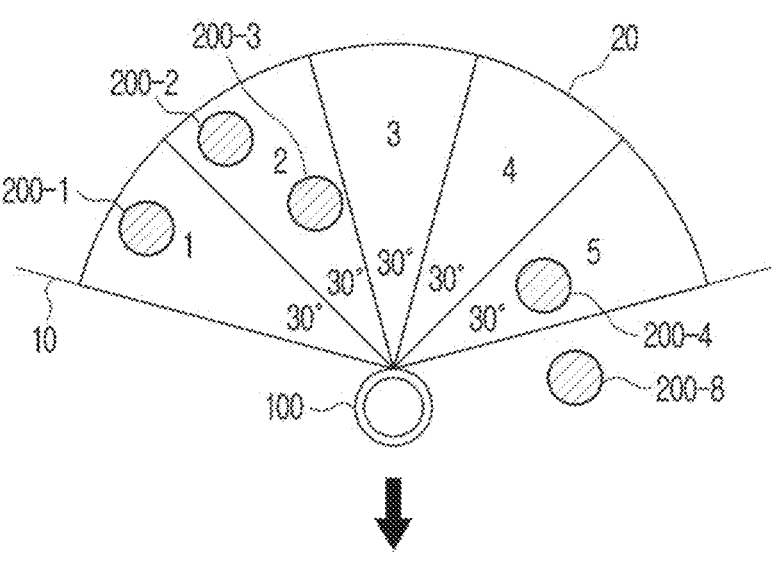
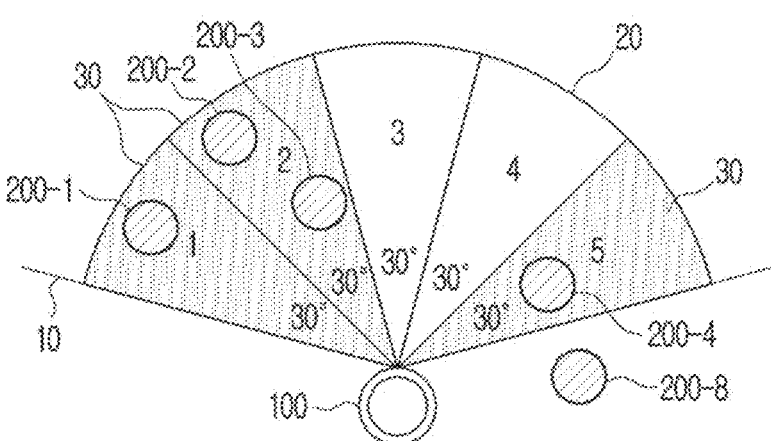

FIG. 6

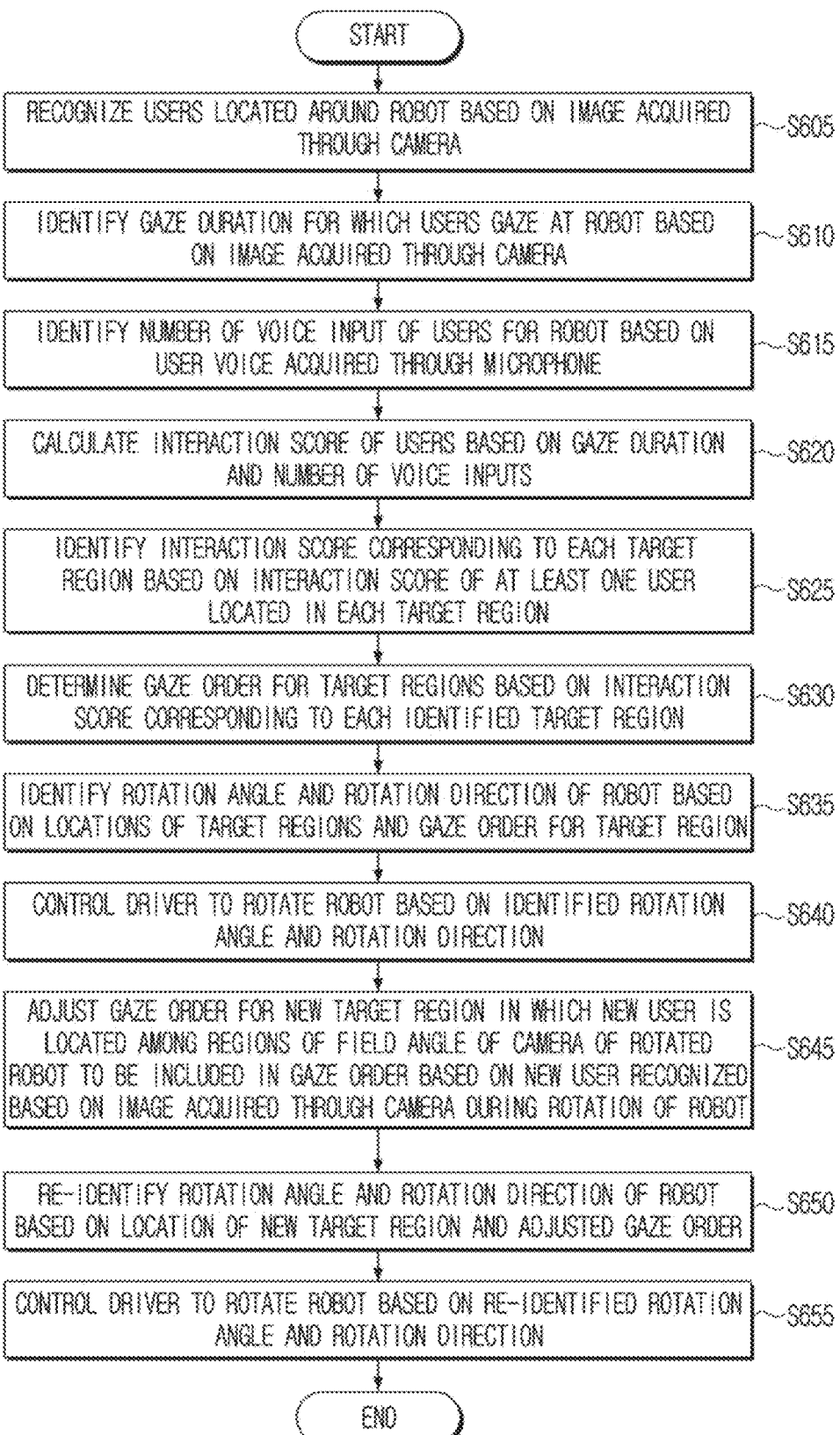

START

RECOGNIZE USERS LOCATED AROUND ROBOT BASED ON IMAGE ACQUIRED THROUGH CAMERA ~S605

IDENTIFY GAZE DURATION FOR WHICH USERS GAZE AT ROBOT BASED ON IMAGE ACQUIRED THROUGH CAMERA ~S610

IDENTIFY NUMBER OF VOICE INPUT OF USERS FOR ROBOT BASED ON USER VOICE ACQUIRED THROUGH MICROPHONE ~S615

CALCULATE INTERACTION SCORE OF USERS BASED ON GAZE DURATION AND NUMBER OF VOICE INPUTS ~S620

IDENTIFY INTERACTION SCORE CORRESPONDING TO EACH TARGET REGION BASED ON INTERACTION SCORE OF AT LEAST ONE USER LOCATED IN EACH TARGET REGION ~S625

DETERMINE GAZE ORDER FOR TARGET REGIONS BASED ON INTERACTION SCORE CORRESPONDING TO EACH IDENTIFIED TARGET REGION ~S630

IDENTIFY ROTATION ANGLE AND ROTATION DIRECTION OF ROBOT BASED ON LOCATIONS OF TARGET REGIONS AND GAZE ORDER FOR TARGET REGION ~S635

CONTROL DRIVER TO ROTATE ROBOT BASED ON IDENTIFIED ROTATION ANGLE AND ROTATION DIRECTION ~S640

ADJUST GAZE ORDER FOR NEW TARGET REGION IN WHICH NEW USER IS LOCATED AMONG REGIONS OF FIELD ANGLE OF CAMERA OF ROTATED ROBOT TO BE INCLUDED IN GAZE ORDER BASED ON NEW USER RECOGNIZED BASED ON IMAGE ACQUIRED THROUGH CAMERA DURING ROTATION OF ROBOT ~S645

RE-IDENTIFY ROTATION ANGLE AND ROTATION DIRECTION OF ROBOT BASED ON LOCATION OF NEW TARGET REGION AND ADJUSTED GAZE ORDER ~S650

CONTROL DRIVER TO ROTATE ROBOT BASED ON RE-IDENTIFIED ROTATION ANGLE AND ROTATION DIRECTION ~S655

END

GAZE ORDER: SECOND REGION → FIFTH REGION → FIRST REGION

GAZE ORDER: FIFTH REGION → FIRST REGION → SECOND REGION

FIG. 8

START

RECOGNIZE USERS LOCATED AROUND ROBOT BASED ON IMAGE ACQUIRED THROUGH CAMERA ──S810

DIVIDE FIELD ANGLE OF CAMERA AT PREDETERMINED ANGLE AND IDENTIFY REGIONS ──S820

IDENTIFY FIRST TARGET REGION AMONG TARGET REGIONS BASED ON GAZE ORDER AND IDENTIFY ROTATION ANGLE AND ROTATION DIRECTION OF ROBOT CORRESPONDING TO FIRST TARGET REGION BASED ON LOCATION OF FIRST TARGET REGION ──S830

IDENTIFY ROTATION ANGLE AND ROTATION DIRECTION OF ROBOT CORRESPONDING TO REMAINING TARGET REGION AMONG TARGET REGIONS BASED ON LOCATION OF TARGET REGION IN PREVIOUS ORDER OF REMAINING TARGET REGION AND LOCATION OF REMAINING TARGET REGION ──S840

CONTROL DRIVER TO ROTATE ROBOT BASED ON IDENTIFIED ROTATION ANGLE AND ROTATION DIRECTION ──S850

ADJUST GAZE ORDER FOR NEW TARGET REGION IN WHICH NEW USER IS LOCATED AMONG REGIONS OF FIELD ANGLE OF CAMERA OF ROTATED ROBOT TO BE INCLUDED IN GAZE ORDER BASED ON NEW USER RECOGNIZED BASED ON IMAGE ACQUIRED THROUGH CAMERA DURING ROTATION OF ROBOT ──S860

RE-IDENTIFY ROTATION ANGLE AND ROTATION DIRECTION OF ROBOT BASED ON LOCATION OF NEW TARGET REGION AND ADJUSTED GAZE ORDER ──S870

CONTROL DRIVER TO ROTATE ROBOT BASED ON RE-IDENTIFIED ROTATION ANGLE AND ROTATION DIRECTION ──S880

END

FIG. 9
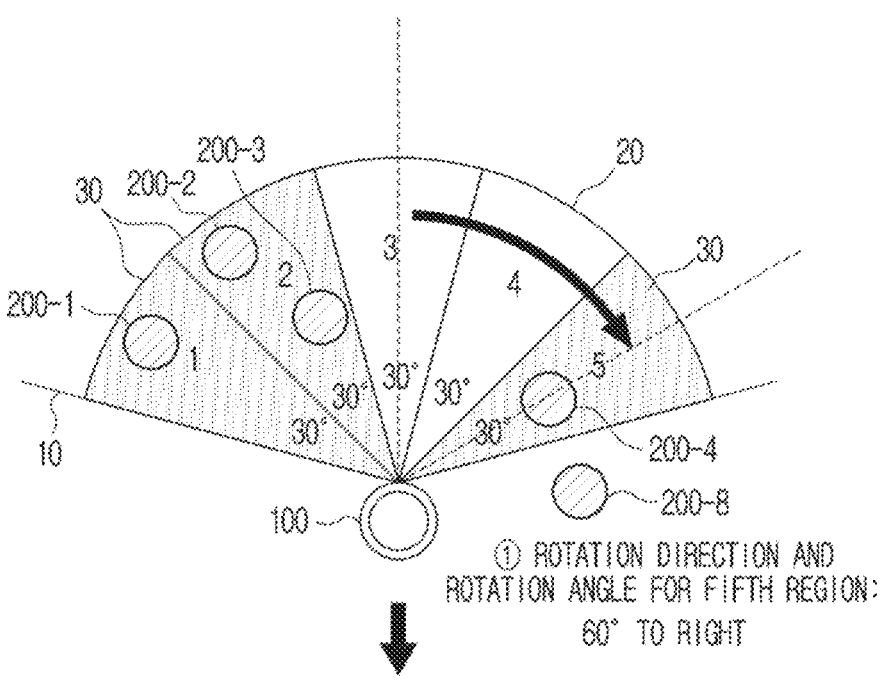
① ROTATION DIRECTION AND
ROTATION ANGLE FOR FIFTH REGION:
60° TO RIGHT
GAZE ORDER:   FIFTH REGION -> FIRST REGION -> SECOND REGION
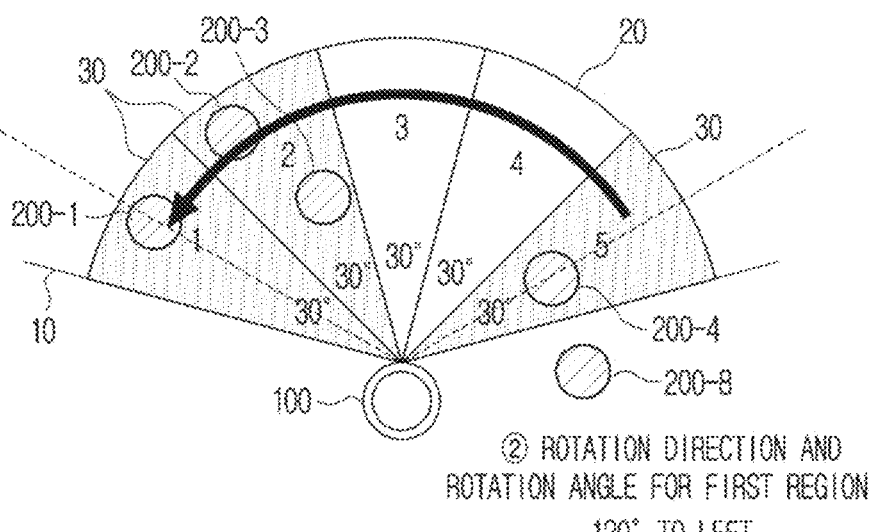
② ROTATION DIRECTION AND
ROTATION ANGLE FOR FIRST REGION :
120° TO LEFT

GAZE ORDER:  FIFTH REGION -> FIRST REGION -> SECOND REGION

ROTATION DIRECTION AND
ROTATION ANGLE FOR SECOND REGION :
30° TO RIGHT

GAZE ORDER: FIFTH REGION -> FIRST REGION -> SECOND REGION

FIG. 12

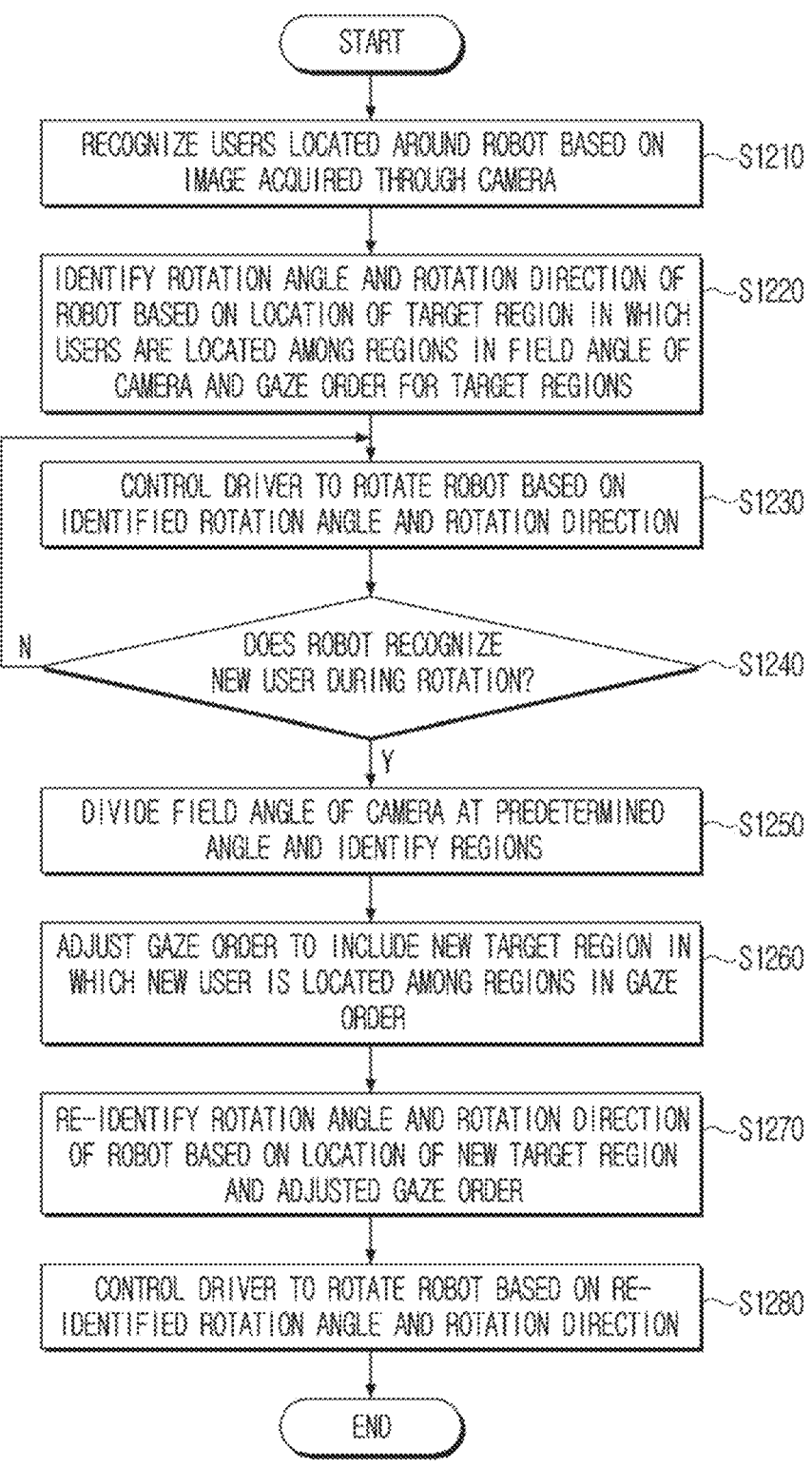

START

S1210 — RECOGNIZE USERS LOCATED AROUND ROBOT BASED ON IMAGE ACQUIRED THROUGH CAMERA

S1220 — IDENTIFY ROTATION ANGLE AND ROTATION DIRECTION OF ROBOT BASED ON LOCATION OF TARGET REGION IN WHICH USERS ARE LOCATED AMONG REGIONS IN FIELD ANGLE OF CAMERA AND GAZE ORDER FOR TARGET REGIONS

S1230 — CONTROL DRIVER TO ROTATE ROBOT BASED ON IDENTIFIED ROTATION ANGLE AND ROTATION DIRECTION

S1240 — DOES ROBOT RECOGNIZE NEW USER DURING ROTATION?   N   Y

S1250 — DIVIDE FIELD ANGLE OF CAMERA AT PREDETERMINED ANGLE AND IDENTIFY REGIONS

S1260 — ADJUST GAZE ORDER TO INCLUDE NEW TARGET REGION IN WHICH NEW USER IS LOCATED AMONG REGIONS IN GAZE ORDER

S1270 — RE-IDENTIFY ROTATION ANGLE AND ROTATION DIRECTION OF ROBOT BASED ON LOCATION OF NEW TARGET REGION AND ADJUSTED GAZE ORDER

S1280 — CONTROL DRIVER TO ROTATE ROBOT BASED ON RE-IDENTIFIED ROTATION ANGLE AND ROTATION DIRECTION

END

FIG. 14
GAZE ORDER:  FIFTH REGION -> FIRST REGION -> SECOND REGION
GAZE ORDER:  FIFTH REGION -> FIRST REGION -> SECOND REGION -> SIXTH REGION
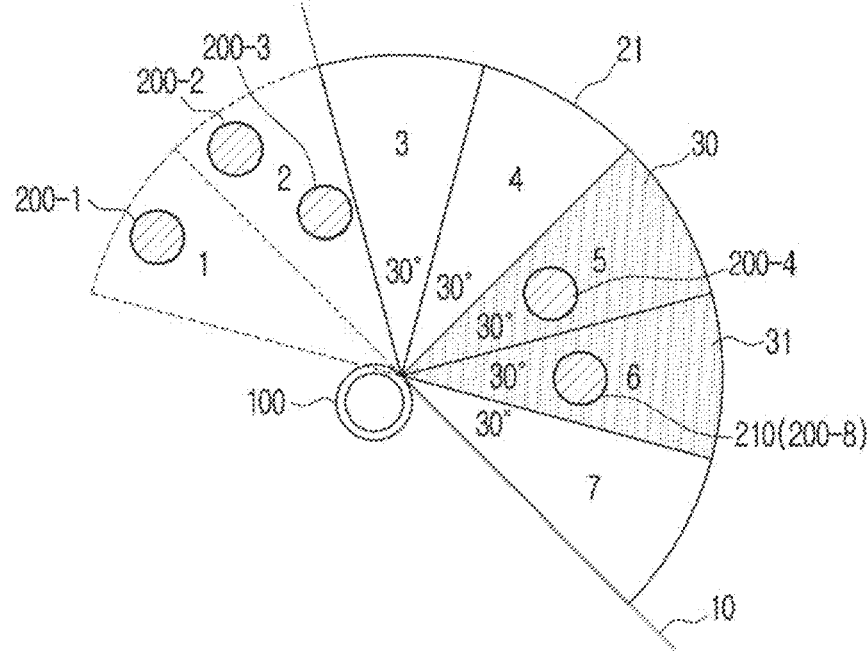
GAZE ORDER:  FIFTH REGION -> FIRST REGION -> SECOND REGION -> SIXTH REGION
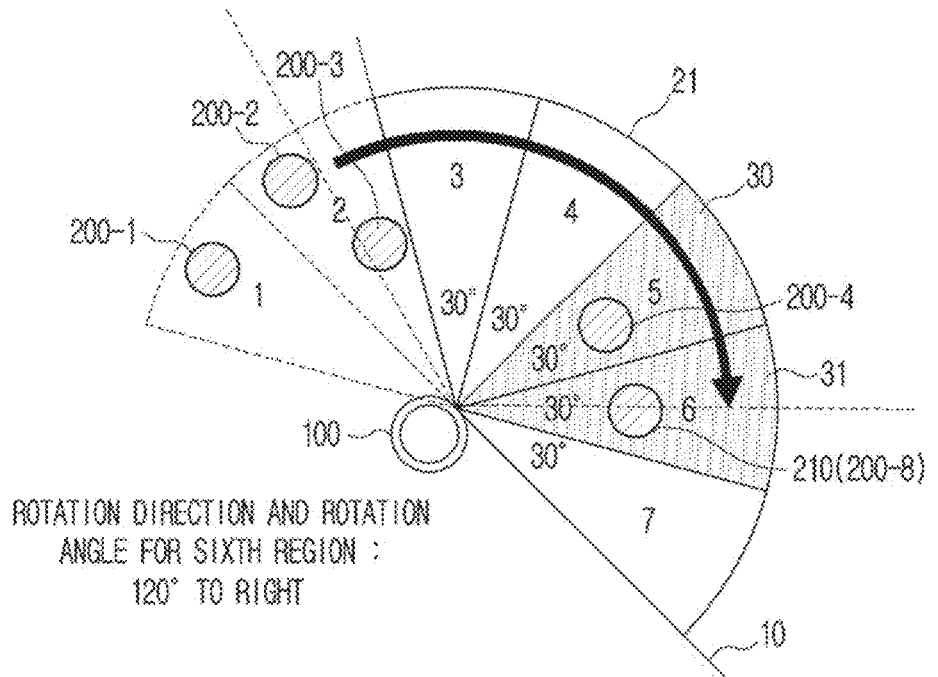
ROTATION DIRECTION AND ROTATION
ANGLE FOR SIXTH REGION :
120° TO RIGHT

FIG. 15
GAZE ORDER: FIFTH REGION -> FIRST REGION -> SECOND REGION
GAZE ORDER: FIFTH REGION -> SIXTH REGION -> FIRST REGION -> SECOND REGION
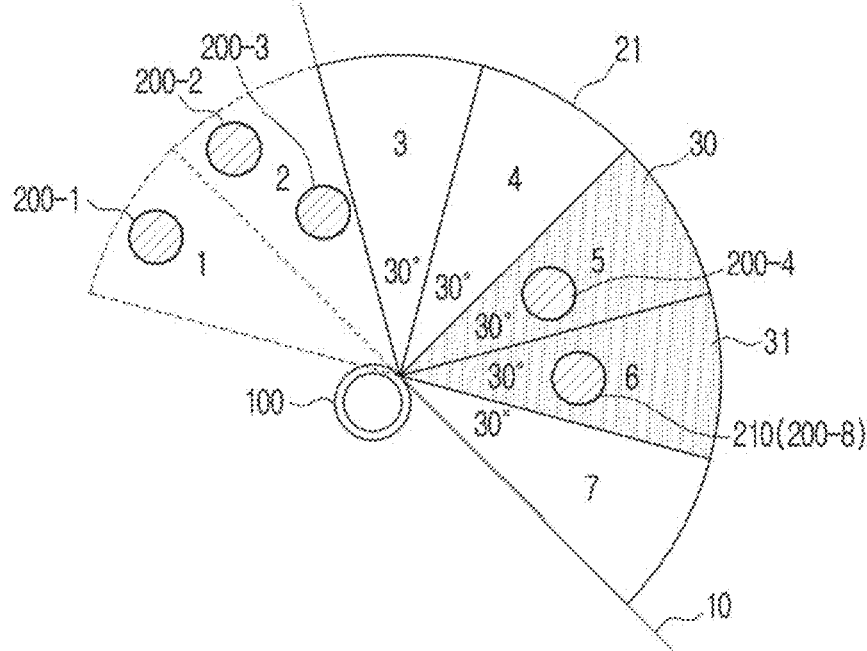
GAZE ORDER: FIFTH REGION -> SIXTH REGION -> FIRST REGION -> SECOND REGION
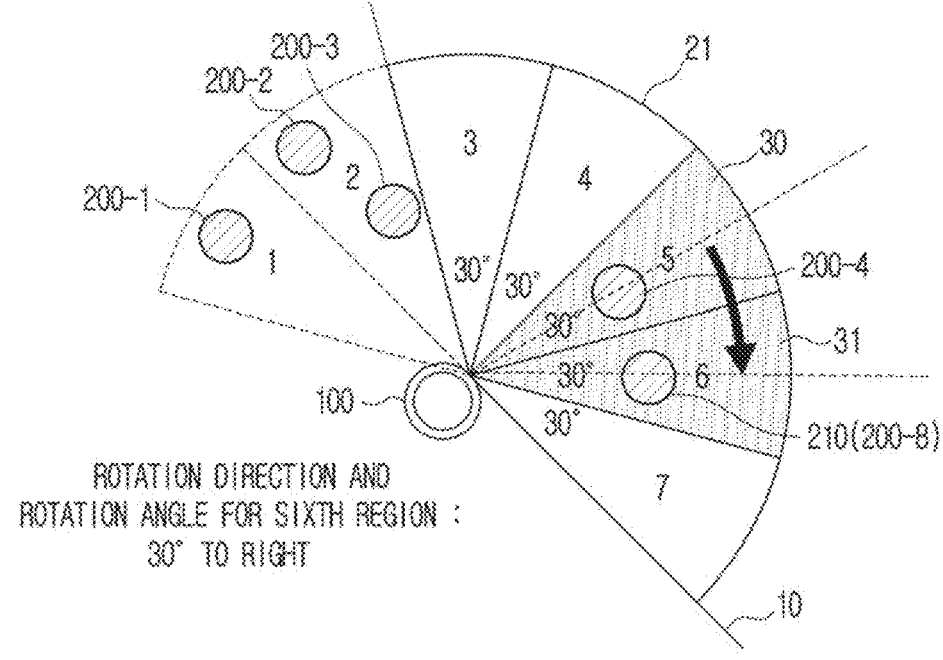
ROTATION DIRECTION AND
ROTATION ANGLE FOR SIXTH REGION :
30° TO RIGHT

GAZE ORDER:   FIFTH REGION -> SIXTH REGION -> FIRST REGION -> SECOND REGION

ROTATION DIRECTION AND
ROTATION ANGLE FOR FIRST REGION:    CHANGE    ROTATION DIRECTION AND
120° TO LEFT    ⟹    ROTATION ANGLE FOR FIRST REGION:
150° TO LEFT

ROBOT AND METHOD FOR CONTROLLING THEREOF

CROSS-REFERENCE TO RELATED APPLICATION(S)

This application is a bypass continuation of International Application No. PCT/KR2024/003231, filed on Mar. 13, 2024, which is based on and claims priority to Korean Patent Application No. 10-2023-0082088, filed on Jun. 26, 2023, in the Korean Intellectual Property Office, the disclosures of which are incorporated by reference herein in their entireties.

BACKGROUND

1. Field

The disclosure relates to a robot and a control method thereof, and more particularly, to a robot that determines a gaze order for a plurality of users and sequentially gazes at a plurality of users based on the determined gaze order, and a method of controlling the same.

2. Description of Related Art

Recently, with the development of electronic technology, robots have been increasingly used in various industrial fields. The development of object recognition technology has enabled robots to accurately distinguish between various objects, and due to the development of autonomous driving technology, robots may drive stably without interfering with the passage of people in a driving space. Considering serving robots that serve food ordered by users in restaurants or guide robots that give directions to users in airports, large supermarkets, etc., it can be seen that the fields and ways in which robots are used have diversified.

As robots are used in various fields, there are cases in which a plurality of users use a robot at the same time. For example, this may be the case when a large number of visitors are guided by a robot at an exhibition or when a large number of travelers are guided by a robot at an airport.

SUMMARY

According to an aspect of the disclosure, a robot includes: a camera; a driver; at least one memory storing instructions; and at least one processor operatively connected to the at least one memory. The at least one processor may be configured to execute the instructions to: recognize at least one user located around the robot based on an image acquired through the camera; identify a first rotation angle and a first rotation direction of the robot based on a location of at least one target region in which the at least one user is located among a plurality of regions within a field angle of the camera and a first gaze order for the at least one target region; control the driver to rotate the robot based on the first rotation angle and the first rotation direction; based on a new user being recognized from the image during rotation of the robot, generate a second gaze order may include a new target region in which the new user is located among the plurality of regions within the field angle of the camera; identify a second rotation angle and a second rotation direction of the robot based on a location of the new target region and the second gaze order; and control the driver to rotate the robot based on the second rotation angle and the second rotation direction.

The at least one processor may be further configured to execute the instructions to: identify the plurality of regions by dividing the field angle of the camera by a predetermined angle; identify, based on the at least one target region being a plurality of target regions, a first target region among the plurality of target regions based on the first gaze order; identify the first rotation angle and the first rotation direction of the robot corresponding to the first target region based on a location of the first target region; identify the first rotation angle and the first rotation direction of the robot corresponding to a remaining target region among the plurality of target regions based on the location of the first target region and a location of the remaining target region; and control the driver to rotate the robot according to the first gaze order based on the first rotation angle and the first rotation direction.

The at least one processor may be further configured to execute the instructions to: identify the plurality of regions by dividing the field angle of the camera by a predetermined angle. The at least one target region and the new target region may be among the plurality of regions.

The at least one processor may be configured to: based on the at least one target region being a plurality of target regions, identify a next target region next in order to a current target region at which the robot is gazing based on the second gaze order, the plurality of target regions may include an unattended target region and the new target region; identify a next rotation angle and a next rotation direction of the robot corresponding to the next target region based on a location of the next target region; and identify a remaining rotation angle and a remaining rotation direction of the robot corresponding to a remaining target region after the next target region based on a location of the next target region and a location of the remaining target region.

The at least one processor may be further configured to execute the instructions to: based on the next target region being the new target region, identify the second rotation angle and the second rotation direction based on the location of the new target region; identify a third rotation angle and a third rotation direction of the robot corresponding to the unattended target region based on the location of the new target region; and control the driver to rotate the robot based on the third rotation angle and the third rotation direction after the robot gazes at the new target region.

The at least one processor may be further configured to execute the instructions to: based on the next target region being the unattended target region, identify the second rotation angle and the second rotation direction based on the location of the new target region and a location of the unattended target region coming before the new target region; and control the driver to rotate the robot based on the second rotation angle and the second rotation direction after gazing at the unattended target region before the new target region.

The at least one processor may be further configured to execute the instructions to: based on the rotation angle of the robot for gazing at the new target region being equal to or greater than a predetermined critical angle, maintain the first gaze order without including the new target region in the first gaze order.

The at least one processor may be further configured to execute the instructions to: identify a plurality of first users located around the robot based on the image acquired through the camera; and identify a plurality of users in a same user group among the plurality of first users based on at least one of a distance between the plurality of first users, a time at which the plurality of first users are located within the field angle of the camera, and whether the plurality of first users have a conversation.

The robot further may include a microphone configured to receive a user voice. The at least one processor may be further configured to execute the instructions to: based on the at least one user being a plurality of users and the at least one target region being a plurality of target regions, identify gaze durations that the plurality of users gaze at the robot based on the image acquired through the camera; identify a number of voice inputs of the plurality of users for the robot based on the user voice acquired through the microphone; calculate interaction scores of the plurality of users based on the gaze durations and the number of voice inputs; identify a regional interaction score corresponding to each target region based on the interaction score of at least one user respectively located in each target region; and determine the first gaze order for the plurality of target regions based on the regional interaction score corresponding to each target region.

The at least one processor may be further configured to execute the instructions to: determine a regional gaze duration for each target region based on the regional interaction score corresponding to each target region; and control the driver to cause the robot to gaze at each target region during the regional gaze duration.

According to an aspect of the disclosure, a controlling method of a robot includes: recognizing at least one user located around the robot based on an image acquired through a camera; identifying a first rotation angle and a first rotation direction of the robot based on a location of at least one target region in which the at least one user is located among a plurality of regions within a field angle of the camera and a first gaze order for the at least one target region; controlling a driver to rotate the robot based on the first rotation angle and the first rotation direction; based on a new user being recognized from the image during rotation of the robot, generating a second gaze order may include a new target region in which the new user is located among the plurality of regions within the field angle of the camera; identify a second rotation angle and a second rotation direction of the robot based on a location of the new target region and the second gaze order; and controlling the driver to rotate the robot based on the second rotation angle and the second rotation direction.

The identifying of the first rotation angle and the first rotation direction may include: identifying the plurality of regions by dividing the field angle of the camera by a predetermined angle; identifying, based on the at least one target region being a plurality of target regions, a first target region among the plurality of target regions based on the first gaze order; identifying the first rotation angle and the first rotation direction of the robot corresponding to the first target region based on a location of the first target region; and identifying the first rotation angle and the first rotation direction of the robot corresponding to a remaining target region among the plurality of target regions based on the location of the first target region and a location of the remaining target region.

The identifying of the second rotation angle and the second rotation direction further may include identifying the plurality of regions by dividing the field angle of the camera by a predetermined angle. The at least one target region and the new target region may be among the plurality of regions.

The identifying of the first rotation angle and the first rotation direction may include: based on the at least one target region being a plurality target regions, identifying a next target region next in order to a current target region at which the robot is gazing based on the second gaze order, the plurality of target regions may include an unattended target region and the new target region; identifying a next rotation angle and a next rotation direction of the robot corresponding to the next target region based on a location of the next target region; and identifying a remaining rotation angle and a remaining rotation direction of the robot corresponding to a remaining target region after the next target region based on a location of the next target region and a location of the remaining target region.

The identifying of the next rotation angle and the next rotation direction may include based on the next target region being the new target region, identifying the second rotation angle and the second rotation direction based on the location of the new target region. The identifying of the remaining rotation angle and the remaining rotation direction may include identifying a third rotation angle and a third rotation direction of the robot corresponding to the unattended target region based on the location of the new target region. The controlling of the driver to rotate the robot based on the third rotation angle and the third rotation direction may include controlling the driver to rotate the robot based on the third rotation angle and the third rotation direction after the robot gazes at the new target region.

The controlling method further may include: based on the next target region being the unattended target region, identifying the second rotation angle and the second rotation direction based on the location of the new target region and a location of the unattended target region coming before the new target region; and controlling the driver to rotate the robot based on the second rotation angle and the second rotation direction after gazing at the unattended target region before the new target region.

The controlling method further may include: based on the rotation angle of the robot for gazing at the new target region being equal to or greater than a predetermined critical angle, maintaining the first gaze order without including the new target region in the first gaze order.

The controlling method further may include: identifying a plurality of first users located around the robot based on the image acquired through the camera; and identifying a plurality of users in a same user group among the plurality of first users based on at least one of a distance between the plurality of first users, a time at which the plurality of first users are located within the field angle of the camera, and whether the plurality of first users have a conversation.

The controlling method further may include: based on the at least one user being a plurality of users and the at least one target region being a plurality of target regions, identifying gaze durations that the plurality of users gaze at the robot based on the image acquired through the camera; identifying a number of voice inputs of the plurality of users for the robot based on a user voice acquired through a microphone; calculating interaction scores of the plurality of users based on the gaze durations and the number of voice inputs; identifying a regional interaction score corresponding to each target region based on the interaction score of at least one user respectively located in each target region; and determining the first gaze order for the plurality of target regions based on the regional interaction score corresponding to each target region.

The controlling method further may include: determining a regional gaze duration for each target region based on the regional interaction score corresponding to each target region; and controlling the driver to cause the robot to gaze at each target region during the regional gaze duration.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flowchart of a method of controlling a robot according to one or more embodiments of the disclosure;

FIG. 5 is a diagram illustrating identifying a target region among a plurality of regions within the field angle of a camera according to one or more embodiments of the disclosure;

FIG. 6 is a flowchart illustrating a method of determining an gaze order based on an interaction score according to one or more embodiments of the disclosure;

FIG. 8 is a flowchart illustrating a control method of identifying a rotation direction and a rotation angle of a plurality of target regions according to the gaze order according to one or more embodiments of the disclosure;

FIG. 9 is a diagram illustrating identifying a rotation direction and a rotation angle of a plurality of target regions according to a gaze order according to one or more embodiments of the disclosure;

FIG. 12 is a flowchart illustrating a control method of re-identifying a rotation angle and a rotation direction of a plurality of target regions based on recognition of a new user according to one or more embodiments;

FIG. 14 is a diagram illustrating re-identifying a rotation direction and a rotation angle of a robot based on a location of a new target region according to one or more embodiments of the disclosure;

FIG. 15 is a diagram illustrating re-identifying a rotation direction and a rotation angle of a robot based on a location of a new target region according to one or more embodiments of the disclosure;

DETAILED DESCRIPTION

Figure 1:
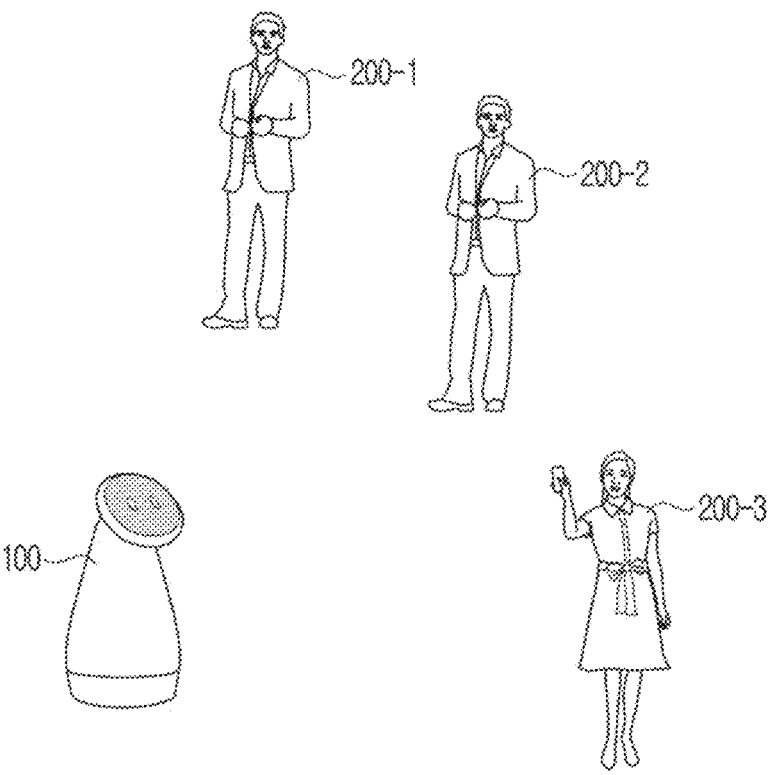
FIG. 1 is a diagram of a robot that responds to a plurality of users.

The disclosure may be variously modified and have several embodiments, and specific embodiments of the disclosure are shown in the drawings and described in detail in the detailed description. However, it is to be understood that technologies mentioned in the disclosure are not limited to the specific embodiments, and include various modifications, equivalents, and/or alternatives according to the embodiments of the disclosure. Throughout the accompanying drawings, similar components are denoted by similar reference numerals.

In describing the disclosure, when it is decided that a detailed description for the known functions or configurations related to the disclosure may unnecessarily obscure the gist of the disclosure, the detailed description thereof is omitted.

In addition, the following embodiments may be modified in several different forms, and the scope and spirit of the disclosure are not limited to the following embodiments. Rather, these embodiments are provided to make the disclosure thorough and complete, and to completely transfer the spirit of the disclosure to those skilled in the art.

Terms used in the disclosure are used only to describe the specific embodiments rather than limiting the scope of the disclosure. Terms of a singular form may include plural forms unless explicitly indicated otherwise.

In the disclosure, the expression "have," "may have," "include," "may include" or the like, indicates existence of a corresponding feature (for example, a numerical value, a function, an operation or a component, such as a part), and does not exclude existence of an additional feature.

In the disclosure, the expression "A or B," "least one of A and/or B" or "one or more of A and/or B" or the like, may include all possible combinations of items enumerated together. For example, "A or B," "at least one of A and B," or "at least one of A or B" may indicate all of 1) a case where at least one A is included, 2) a case where at least one B is included, or 3) a case where both of at least one A and at least one B are included.

The expressions "first," "second" and the like, used in the disclosure may indicate various components regardless of a sequence and/or importance of the components. These expressions are only used in order to distinguish one component from the other components, and do not limit the corresponding components.

In case that any component (for example, a first component) is mentioned to be "(operatively or communicatively) coupled with/to" or "connected to" another component (for example, a second component), it is to be understood that the any component is directly coupled to the another component or may be coupled to the another component through other component (for example, a third component).

In case that any component (for example, the first component) is mentioned to be "directly coupled" or "directly connected to" another component (for example, the second component), it is to be understood that the other component (for example, the third component) is not present between any component and another component.

An expression "configured (or set) to" used in the disclosure may be replaced by an expression "suitable for," "having the capacity to," "designed to," "adapted to," "made to" or "capable of" based on a situation. A term "configured (or set) to" may not necessarily indicate "specifically designed to" in hardware.

Instead, an expression "an apparatus configured to" may indicate that the apparatus may "perform~" together with other apparatuses or components. For example, "a processor configured (or set) to perform A, B, and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In the embodiments, a "module" or a "~er/or" may perform at least one function or operation, and be implemented by hardware or software or be implemented by a combination of hardware and software. In addition, a plurality of "modules" or a plurality of "~ers/ors" may be integrated in at least one module and be implemented by at least one processor except for a "module" or an "~er/or" that needs to be implemented by specific hardware.

Various elements and regions in the drawings are schematically illustrated. Therefore, the spirit of the disclosure is not limited by relative sizes or intervals shown in the accompanying drawings.

Hereinafter, embodiments of the disclosure will be described in detail with reference to the accompanying drawings so that those skilled in the art to which the disclosure pertains may easily practice the disclosure.

FIG. 1 is a diagram of a robot that responds to a plurality of users.

Referring to FIG. 1, as a robot 100 has recently been used in various fields, there are cases in which the robot 100 has to respond to a plurality of users 200-1, 200-2, and 200-3 (hereinafter referred to as 200). Here, responding by the robot 100 to a plurality of users 200 may refer to that the robot 100 interact with a plurality of users 200 simultaneously. For example, the robot 100 may include a robot that guides a large number of visitors at an exhibition or fair or a robot that guides the way or provides information to a large number of visitors at an airport or a large supermarket.

At this time, the existing robot 100 interacts with a specific user among a plurality of users 200 or randomly interacts with a plurality of users 200. Accordingly, in most cases, a plurality of users 200 did not feel that they were properly interacting with the robot 100. In particular, in case that a plurality of users request the robot 100 to provide specific information, if the robot 100 interacts with only a specific user among a plurality of users 200, the information provided by the robot 100 may not be properly delivered to the other users excluding the specific user.

In addition, the existing robot 100 did not include a specific user among a plurality of users 200 as an interaction target even if the robot 100 recognizes the specific user, that the robot 100 did not recognize, later. In this case, even though the specific user recognized later is included in the same user group (e.g., the same audience group or visitor group, etc.) as a plurality of users 200, the specific user is disadvantaged of being excluded from the interaction target of the robot 100 only because the specific user is recognized later than the other users. In other words, a problem occurs in which the specific user who is recognized later cannot interact with the robot 100.

The disclosure is intended to solve this problem. When a plurality of users 200 use the robot 100, the robot 100 determines an appropriate interaction order to evenly interact with a plurality of users 200 and sequentially perform interaction with a plurality of users 200 according to a gaze order. Also, even when a new user is recognized, the robot 100 does not omit the new user and interacts with the new user along with the existing a plurality of users 200. Hereinafter, embodiments of the disclosure related to this will be described in detail.

Figure 2:
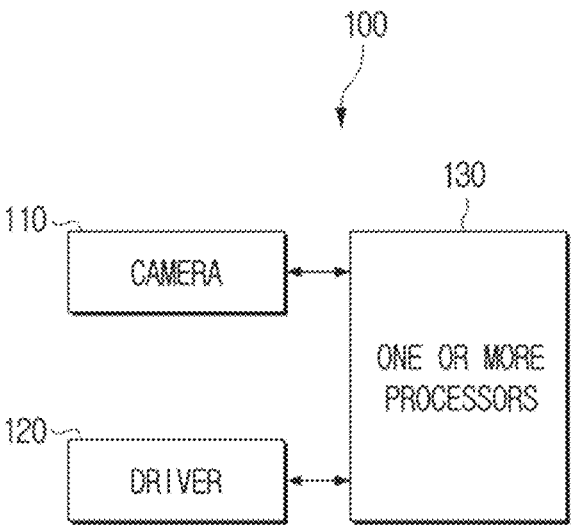
FIG. 2 is a block diagram illustrating a configuration of a robot according to one or more embodiments of the disclosure.

FIG. 2 is a block diagram illustrating a configuration of a robot according to one or more embodiments of the disclosure.

Referring to FIG. 2, the robot 100 includes a camera 110, a driver 120, and one or more processors 130.

The robot 100 according to one or more embodiments of the disclosure may be implemented as various electronic devices that provide various services to a user, while interacting with the user. For example, the robot 100 may be a guide robot 100 located in an airport or a mart to provide various services, such as providing specific information, guiding the way, etc. to the user as a response based on an input (e.g., a voice input, a touch input, etc.) received from the user.

According to one or more embodiments of the disclosure, the robot 100 may be divided into a head and a body. As one or more examples, the head of the robot 100 may include the camera 110 or a sensor to acquire images of objects around the robot 100 or perform a function of detecting objects. In addition, the head of the robot 100 may include a display, and the robot 100 may display various image information through the display. In particular, while the robot 100 is interacting with the user, the robot may display graphic objects representing the eyes, nose, and mouth through the display included in the head and provide a lively interaction experience to the user using the robot 100.

The body of the robot 100 may be connected to the driver 120 and may perform a function of frame moving the robot 100 or supporting the robot 100. In addition, the body of the robot 100 may include a display and may display various image information through the display. In particular, the robot 100 may display information requested by the user or required by the user (e.g., user interface (UI), etc.) through the display and may receive a user command from the user through a touch panel included in the display.

The camera 110 images objects around the robot 100 and acquires a plurality of images regarding the objects. Specifically, the camera 110 may acquire images of objects (e.g., people, animals, other objects, etc.) existing around the robot 100.

To this end, the camera 110 may be implemented as an imaging device, such as a CMOS image sensor (CIS) having a CMOS structure or a charge coupled device (CCD) having a CCD structure. However, the disclosure is not limited thereto, and the camera 110 may be implemented as a camera 110 module with various resolutions capable of imaging a subject.

In addition, the camera 110 may be implemented as a depth camera 110, a stereo camera 110, or an RGB camera 110. Through this, the camera 110 may acquire depth information on the object along with an image regarding the object.

The driver 120 drives at least a portion of the robot 100. As one or more examples, the driver 120 may be implemented as a rotatable motor that connects the head and the body of the robot 100. Accordingly, the driver 120 rotates the head connected to the driver 120 by 360° to allow the robot 100 to obtain information on objects around the robot 100 through the camera 110. However, the disclosure is not limited thereto, and the robot 100 may be implemented as an integrated body in which the head and the body are not separated. In this case, the body and the head may be distinguished from each other on the robot 100 according to the functions they each perform.

Also, as one or more examples, the driver 120 may be provided in a lower portion of the body of the robot 100 and move the robot 100. That is, the driver 120 may be a device that may drive the robot 100. At this time, the driver 120 may adjust a traveling direction and a traveling speed under the control by the processor. To this end, the driver 120 may include a power generating device that generates power for the robot 100 to travel (e.g., a gasoline engine, diesel engine, liquefied petroleum gas (LPG) engine, an electric motor, etc. depending on the used fuel (or an energy source), a steering device for controlling a traveling direction (e.g., mechanical steering, hydraulics steering, electronic control power steering (EPS), etc.).

In addition, the driver 120 may include a plurality of wheels. The plurality of wheels may be rotated based on control of the processor, and the robot 100 may be moved accordingly. Alternatively, the plurality of wheels may be rotated at different rotation speeds (or only some of the plurality of wheels may be rotated) based on control of the processor, and the robot 100 may be rotated accordingly.

One or more processors are electrically connected to the camera 110 and the driver 120 and control an overall operation and functions of the robot 100.

One or more processors 130 may include one or more of a central processing unit (CPU), graphics processing unit (GPU), accelerated processing unit (APU), many integrated core (MIC), digital signal processor (DSP), neural processing unit (NPU), a hardware accelerator, or a machine learning accelerator. One or more processors 130 may control one or any combination of other components of the robot 100 and may perform operations related to communication or data processing. One or more processors 130 may execute one or more programs or instructions stored in a memory. For example, one or more processors 130 may perform a method according to one or more embodiments of the disclosure by executing one or more instructions stored in the memory.

When the method according to one or more embodiments of the disclosure includes a plurality of operations, the plurality of operations may be performed by one processor or by a plurality of processors. For example, when a first operation, a second operation, and a third operation are performed by the method according to one or more embodiments, the first operation, the second operation, and the third operation may all be performed by a first processor, or the first operation and the second operation may be performed by the first processor (e.g., a general-purpose processor) and the third operation may be performed by a second processor (e.g., an artificial intelligence-specific processor).

One or more processors 130 may be implemented as a single core processor including one core or may be implemented as one or more multi-core processors including a plurality of cores (e.g., homogeneous multi-core or heterogeneous multi-core). When one or more processors 130 are implemented as a multi-core processor, each of the plurality of cores included in the multi-core processor may include an internal memory of the processor 130, such as a cache memory and an on-chip memory, and a common cache shared by the plurality of cores may be included in the multi-core processor. In addition, each of the plurality of cores (or some of the plurality of cores) included in the multi-core processor may independently read and perform program instructions for implementing the method according to one or more embodiments of the disclosure, and all (or some) of the plurality of cores may be linked to read and perform program instructions for implementing the method according to one or more embodiments of the disclosure.

When the method according to one or more embodiments of the disclosure includes a plurality of operations, the plurality of operations may be performed by one core among the plurality of cores included in the multi-core processor or may be performed by the plurality of cores. For example, when the first operation, the second operation, and the third operation are performed by the method according to one or more embodiments, the first operation, the second operation, and the third operation may all be performed by a first core included in the multi-core processor, the first operation and the second operation may be performed by the first core included in the multi-core processor, and the third operation may be performed by a second core included in the multi-core processor.

In one or more embodiments of the disclosure, the processor 130 may be a system-on-chip (SoC) in which one or more processors and other electronic components are integrated, a single-core processor, a multi-core processor, or a core included in a single-core processor or a multi-core processor, and here, the core may be implemented as a CPU, GPU, APU, MIC, DSP, NPU, hardware accelerator, or machine learning accelerator, but embodiments of the disclosure are not limited thereto.

Hereinafter, for convenience of description, the one or more processors 130 are referred to as a processor 130.

FIG. 3 is a flowchart of a method of controlling a robot according to one or more embodiments of the disclosure.

Referring to FIG. 3, the processor 130 recognizes at least one user 200 located around the robot 100 based on an image acquired through the camera (S310).

Specifically, the processor 130 may acquire a plurality of images of objects, people, animals, etc. around the robot 100 through the camera. Then, the processor 130 may extract feature information on at least one user 200 included in the image acquired through the camera, match the extracted feature information to the at least one user 200 in the image to recognize the at least one user 200 in the image. In addition, the robot 100 may track and recognize at least one user 200 within the plurality of images based on the feature information matched to the at least one user 200.

At this time, the processor 130 may select and recognize, as the user 200, only those who interact with the robot 100 or want to interact with the robot 100 among the plurality of people around the robot 100. In other words, the processor 130 may recognize, as the user 200, a person located around the robot 100 to use the robot 100 among a plurality of people. For example, the processor 130 may not recognize, as the user 200, a person simply located around the robot 100 or passing around the robot 100 and may recognize, as the user 200, a person located around the robot 100 to use the robot 100.

To this end, the processor 130 may identify a distance between each of a plurality of people and the robot 100 based on the acquired image and select at least one user 200 from the plurality of people based on the identified distance. For example, the processor 130 may identify a distance between each of a plurality of people and the robot 100 based on depth information included in the acquired image and distinguishably recognize, as the user 200, only a person at an identified distance within a predetermined distance. At this time, the processor 130 may identify, as the user 200, a person identified as gazing at the robot 100 among people who stay within the predetermined distance for a predetermined time. The processor 130 may extract feature information on the user 200 from the acquired image and continuously track and recognize the user 200 included in the plurality of images based on the extracted feature information.

In addition, the processor 130 may select and identify at least one user 200 among a plurality of people depending on whether each person interacts with the robot 100. Here, the interaction refers to whether the robot 100 gazes (or a gaze duration), whether a voice command is input to the robot 100 (or the number of inputs), whether a touch is input (and the number of inputs), a change in distance between the robot 100 and the person. For example, the processor 130 may extract feature information on a plurality of people included in the image, recognize the eyes of the plurality of people based on the extracted feature information, and identify whether each person gazes at the robot 100. In addition, the processor 130 may distinguishably identify at least one user 200 who wants to use the robot 100 among a plurality of people based on whether each person gazes at the robot 100 and a gaze duration.

According to one or more embodiments of the disclosure, the processor 130 may selectively recognize only a plurality of users 200 included in the same user group among a plurality of users 200. Here, the user group may be a group including a plurality of users located around the robot 100 with the same purpose of using the robot 100. The processor 130 may control the robot 100 so that the robot 100 gazes only at a plurality of users 200 included in the same user group.

To this end, the processor 130 may identify whether a plurality of users 200 around the robot 100 are included in the same user group. As one or more examples, the processor 130 may identify a plurality of user 200 included in the same user group based on whether there is an interaction between a plurality of users 200, a distance between a plurality of users 200, a time difference at which a plurality of users 200 are recognized, etc. based on the image acquired through the camera.

Figure 4:
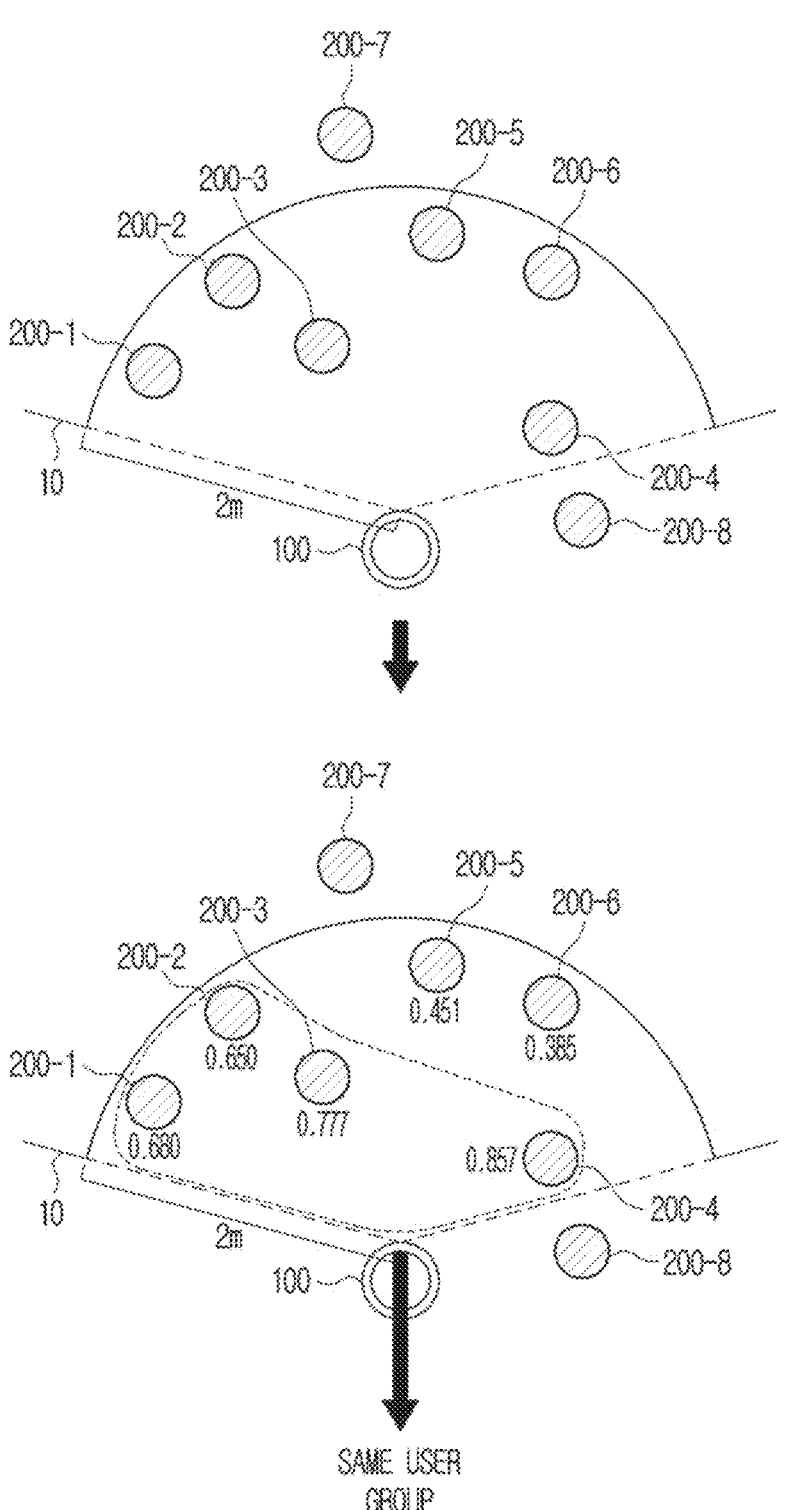
FIG. 4 is a diagram illustrating a method of identifying a plurality of users included in the same user group according to one or more embodiments of the disclosure.

FIG. 4 is a diagram illustrating a method of identifying a plurality of users included in the same user group according to one or more embodiments of the disclosure.

According to one or more embodiments of the disclosure, the processor 130 may identify a plurality of users located around the robot 100 based on an image acquired through the camera 110. In addition, the processor 130 may identify a plurality of users 200 included in the same user group, among a plurality of users 200, based on at least one of the distance between a plurality of users 200, a time at which a plurality of users 200 are located withwithin a field angle 10 of the camera 110, and whether a plurality of users 200 have a conversation.

Specifically, the processor 130 may identify a plurality of users 200 located around the robot 100 based on the image acquired through the camera 110. In particular, the processor 130 may identify a plurality of users 200 among a plurality of people located around the robot 100 based on the image acquired through the camera 110. As one or more examples, the processor 130 may identify a distance between the robot 100 and each person based on depth information on each person included in the image. In addition, the processor 130 may identify only a plurality of people located within a predetermined distance among a plurality of people as a plurality of users 200.

Referring to FIG. 4, the processor 130 may identify a plurality of people 200-1 to 200-8 located within 2 m from the robot 100 within the field angle 10 (150°) of the camera 110 as a plurality of users 200. Accordingly, the processor 130 may identify, as a plurality of users 200, only six people 200-1 to 200-6 located within 2 m from the robot 100 within the field angle 10 (150°) of the camera 110 among the eight people 200-1 to 200-8 around the robot 100. In particular, the processor 130 may not identify a person 200-7 located more than 2 m away from the robot 100 as a user. In addition, the processor 130 may not identify a person 200-8 located outside the field angle 10 (150°) of the camera 110 as a user. At this time, because the person 200-8 located outside the field angle 10 (150°) of the camera 110 is not included in the image acquired through the camera 110, the processor 130 may not be able to recognize the person outside the field angle 10 of the camera 110.

After identifying a plurality of users 200, the processor 130 may select a plurality of users 200 included in the same user group among a plurality of users 200. In particular, the processor 130 may identify a plurality of users 200 included in the same user group among a plurality of users 200 based on at least one of the distance between a plurality of users 200, a time at which a plurality of users 200 are located within the field angle 10 of the camera 110, and whether a plurality of users 200 have a conversation.

Specifically, the processor 130 may identify a distance between the plurality of identified users 200. Specifically, the processor 130 may identify a distance between each user in the image acquired through the camera 110. Through this, the processor 130 may identify a distance between a plurality of users 200. In addition, the processor 130 may identify only a plurality of users 200 identified to have a distance therebetween within a predetermined distance (or interval) as being included in the same user group. For example, referring to FIG. 4, the processor 130 may identify only a plurality of users 200 having a distance therebetween (or between adjacent users) within 30 cm, among the identified six users 200-1 to 200-6, as the same user group.

At this time, the processor 130 may identify whether the interval between the remaining users is within a predetermined distance (or interval) based on a specific user among a plurality of users 200 and include at least one user within a predetermined distance from the specific user and the specific user in the user group. Here, the specific user may be a user first located within the field angle 10 of the camera 110 and a predetermined distance (predetermined distance from the robot 100) among a plurality of users 200.

In addition, the processor 130 may identify a time at which a plurality of users 200 are located within the field angle 10 of the camera 110. Specifically, the processor 130 may identify a time at which each user began to be included in the plurality of images acquired through the camera 110. Through this, the processor 130 may identify a time at which each user is located within the field angle 10 of the camera 110. In particular, the processor 130 may identify even a time at which each user is located not only within the field angle 10 of the camera 110 but also within a predetermined distance. This may be identified based on depth information included in the image, as described above. Accordingly, the processor 130 may identify a time difference between a plurality of users 200 located within the field angle 10 of the camera 110 (and a predetermined distance). In addition, the processor 130 may identify only a plurality of users 200 identified as having a time difference between a plurality of users 200 within a predetermined time as being included in the same user group. For example, referring to FIG. 4, the processor 130 may identify a time at which each of six identified users 200-1 to 200-6 are located within the field angle 10 of the camera 110 (and a predetermined distance). In addition, the processor 130 may identify, as the same user group, only a plurality of users 200 located within the field angle 10 of the camera 110 (and a predetermined distance) as having a time difference of 1 second or less between a plurality of users 200 (or adjacent users).

At this time, the processor 130 may identify a time at which each of the remaining users is located within the field angle 10 of the camera 110 (and a predetermined distance) based on a time at which a specific user, among a plurality of users 200, is located within the field angle 10 of the camera 110 (and a predetermined distance). Also, the processor 130 may identify at least one user located within the field angle 10 of the camera 110 (and a predetermined distance) within a predetermined time (e.g., 3 seconds) based on a time at which the specific user is located within the field angle 10 of the camera 110 (and a predetermined distance). In addition, the processor 130 may include at least one identified user and the specific user in the user group. Here, the specific user may be a user first located within the field angle 10 of the camera 110 and a predetermined distance (a predetermined distance from the robot 100) among a plurality of users 200.

In addition, the processor 130 may select a plurality of users included in the same user group among a plurality of users 200 depending on whether a plurality of users 200 have a conversation with each other (or whether they gaze at each other). Specifically, the processor 130 may recognize each user's face or directly detect each user's mouth and eyes based on a plurality of images acquired through the camera 110. For example, the processor 130 may detect a person's eyes and mouth in an image using the AdaBoost algorithm, HOG (Histogram of Oriented Gradients) algorithm, Haar Cascade algorithm, etc. The processor 130 may track the mouth and eyes of detected users to identify an object at which each user gazes or with which each user has a conversation. Through this, the processor 130 may identify whether a plurality of users 200 have a conversation with each other (or whether they gaze at each other). In addition, the processor 130 may recognize each user's voice input through a microphone of the robot 100, matches each user to the user's voice, and then identify whether there is a conversion between a plurality of users 200. To this end, the processor 130 may use a Hidden Markov Models (HMM) algorithm, a Long Short-Term Memory (LSTM) model, a CNN model, or a Transformer model.

The processor 130 may identify a plurality of users 200 having a conversation as the same user group. For example, referring to FIG. 4, the processor 130 may identify only a plurality of users 200 having a conversation among the six identified users 200-1 to 200-6 as the same user group.

The processor 130 may select a plurality of users 200 included in the same user group among a plurality of users 200 based on a distance between a plurality of users 200, a time at which a plurality of users 200 are located within the field angle 10 of the camera 110 and whether the plurality of users 200 have a conversion.

Specifically, the processor 130 may calculate a provability value included in the same user group of each user based on a distance between a plurality of users 200, a time at which a plurality of users 200 is located within the field angle 10 of the camera 110, and whether a plurality of users 200 have a conversation.

As one or more examples, the processor 130 may calculate, for each user, a first probability value of being included in the same group based on the distance between a plurality of users 200. At this time, the processor 130 may calculate the first probability value of being included in the same user group as a higher value as a distance between a plurality of users 200 decreases. In particular, the processor 130 may calculate the first probability value of being included in the same user group as a specific user as a higher value for a user whose distance from the specific user described above is closer.

In addition, the processor 130 may calculate a second probability value for each user that a plurality of users 200 are included in the same group based on a time at which they are located within the field angle 10 of the camera 110. At this time, the processor 130 may calculate the second probability value of being included in the user group of a plurality of users 200 as a higher value as a time difference between a plurality of users 200 is located within the field angle 10 of the camera 110 decreases. In particular, the processor 130 may calculate the second probability value as a high value for a user whose time difference from the time at which the aforementioned specific user is located within the field angle 10 of the camera 110 is short.

In addition, the processor 130 may calculate a third probability value for each user included in the same group based on whether a plurality of users 200 have a conversation with each other. At this time, the processor 130 may calculate the third probability value regarding whether a plurality of users 200 have a conversation with each other. That is, the processor 130 may identify whether a plurality of users 200 have a conversation with each other based on the acquired image and calculate the third probability value that each user is to have a conversation.

In addition, the processor 130 may acquire a probability value of each user being included in the same user group based on the calculated first, second, and third probability values. As one or more examples, the processor 130 may acquire a probability value of each user being included in the same user group by applying weights to the first, second, and third probability values, respectively. In particular, the processor 130 may apply a higher weight to the third probability value than to the first and second probability values. That is, the processor 130 may identify that a plurality of users 200 conducting a conversation are likely to be included in the same user group. In addition, the processor 130 may add up the first, second, and third probability values to which different weights are applied, to acquire a probability value of each user being included in the same user group. In addition, the processor 130 may identify only a plurality of users 200 for which the acquired probability value is greater than or equal to a predetermined value as the same user group.

For example, referring to FIG. 4, regarding the six identified users 200-1 to 200-6, the processor 130 may acquire a probability value of each being included in the same user group based on distances between the six users 200-1 to 200-6, a time at which the six users 200-1 to 200-6 are located within the field angle 10 of the camera 110, and whether the six users 200-1 to 200-6 have a conversation with each other. At this time, if the predetermined value is 0.5, the processor 130 may identify that only four users 200-1 to 200-4 having a probability value of 0.5 or greater, among the six users 200-1 to 200-6 to the same user group, are included in the same user group.

Hereinafter, the description will be given assuming that the robot 100 performs interaction with four users identified as being included in the same user group.

Referring back to FIG. 3, the processor 130 may identify a rotation angle and a rotation direction of the robot 100 based on a location of at least one target region 30 in which at least one user 200 is located among a plurality of regions 20 within the field angle 10 of the camera and a gaze order for the at least one target region 30 (S320).

Specifically, the processor 130 may identify a plurality of regions 20 within the field angle 10 of the camera. For example, the processor 130 may set a predetermined range within the field angle 10 of the camera and divide the predetermined range into a plurality of regions 20 having a predetermined size to identify them.

As one or more examples, the processor 130 may identify a plurality of regions 20 by dividing the field angle 10 of the camera at a predetermined angle. Here, the predetermined angle may be set in advance according to performance of the field angle 10 of the camera. Alternatively, the predetermined angle may be set by the processor 130 according to the number of users 200 identified within the field angle 10 of the camera. For example, the processor 130 may reduce the size of the predetermined angle as the number of users 200 identified within the field angle 10 decreases.

In addition, the processor 130 may identify the plurality of regions 20 within a predetermined distance. Accordingly, the processor 130 may identify a plurality of regions 20 having a predetermined angle and size. That is, the plurality of regions 20 may have the same size and may be identified within the field angle 10 of the camera in a non-overlapping form. The predetermined distance may be identified based on depth information included in an image acquired through the camera or distance information acquired through a sensor of the robot 100.

Also, the processor 130 may identify a plurality of regions 20 within the field angle 10 of the camera and then identify at least one target region 30 in which at least one user 200 is located among the plurality of regions 20. Here, the target region 30 is a region in which at least one user 200 is located among the plurality of regions 20, and may be a region to which the robot 100 may be rotated to gaze at.

That the robot 100 gazes at the target region 30 may be that the robot 100 or a portion of the robot 100 faces the target region 30. For example, a case in which the head of the robot 100 rotates to face the target region 30 as the processor 130 controls the driver (e.g., a motor, etc.) provided between the head and body of the robot 100 may correspond to a case in which the robot 100 gazes at the target region 30. Alternatively, a case in which the body of the robot 100 rotates to face the target region 30 as the processor 130 controls the driver (e.g., the wheel, etc.) provided on the lower side of the body of the robot 100 may correspond to a case in which the robot 100 gazes at the target region 30. In this way, as the robot 100 or a portion of the robot 100 gazes at the target region 30 under the control of the processor 130, a plurality of users 200 located in the target region 30 may feel as if the robot 100 actively interacts with the user 200.

FIG. 5 is a diagram illustrating identifying a target region among a plurality of regions within a field angle of a camera according to one or more embodiments of the disclosure.

Hereinafter, for convenience of description of the disclosure, it is assumed that at least one user 200 and at least one target region 30 are plural.

Referring to FIG. 5, the processor 130 divide a field angle 10 of 150° at an angle of 30° within a distance of 2 m and identify five regions. Also, the processor 130 may identify, among the five regions, a first region in which one user 200 is located, a second region in which two users 200 are located, and a fifth region in which one user 200 is located are target regions 30. Accordingly, the processor 130 may rotate the robot 100 to identify the first, second, and fifth regions as regions at which the robot 100 may gaze.

After identifying the target region 30, the processor 130 may identify a rotation angle and a rotation direction of the robot 100 based on a plurality of target regions 30 in which a plurality of users 200 are located and a gaze order for the plurality of target regions 30.

Specifically, the processor 130 may identify a rotation angle and a rotation direction of the robot 100 based on the location of the target region 30 within the field angle 10. Because the plurality of regions 20 are identified within the field angle 10 in a non-overlapping form as described above, the processor 130 may identify the location of the target region 30 identified among the plurality of regions 20 within the field angle 10 of the camera. In addition, the processor 130 may identify the rotation direction of the robot 100 based on the location of the identified target region 30. Because the plurality of regions 20 are divided at the same predetermined angle, the processor 130 may identify a rotation angle at which the robot 100 should be rotated in order for the robot 100 to gaze at (or face) the target region 30.

Referring back to FIG. 5, because the first and second regions, among the plurality of target regions 30 (that is, the first, second, and fifth target regions), are identified as being located on the left of the robot 100, the processor 130 may identify a rotation direction of the robot 100 for the first and second regions as a left direction. In addition, the processor 130 may identify the rotation angle of the robot 100 with respect to the first region as 60° and the rotation angle of the robot 100 with respect to the second region as 30°.

Because the fifth region, among the plurality of target regions 30 (that is, the first, second, and fifth target regions), is identified as being located on the right of the robot 100, the processor 130 may identify a rotation direction of the robot with respect to the fifth region as a right direction. In addition, the processor 130 may identify a rotation angle of the robot 100 with respect to the first region as 60°.

However, when a plurality of target regions 30 are identified, the processor 130 may identify the rotation direction and the rotation angle of the robot 100 with respect to the respective target regions 30 in consideration of locations of the plurality of target regions 30 and a gaze order. Here, the gaze order may be an order in which the robot 100 gazes at the plurality of target regions 30.

As one or more examples, the gaze order may be sequentially set for a plurality of target regions 30 based on a predetermined rotation direction. For example, referring to FIG. 5, when the predetermined rotation direction is a clockwise direction, a gaze order for a plurality of target regions (i.e., first, second, and fifth regions) may be an order of the first region, second region, and the fifth region.

As one or more examples, the gaze order may be set based on a distance between the user 200 and the robot 100 located in the target region 30. Specifically, the processor 130 may identify the distance between at least one user 200 located in each target region 30 based on the location of the user 200 and the robot 100. Here, the location of the user 200 may be identified based on depth information included in the acquired image or distance information acquired through a sensor.

In addition, the processor 130 may identify distance information corresponding to the target region 30 based on the distance between the identified at least one user 200 and the robot 100. Also, based on the identified distance information, the processor 130 may determine a gaze order for the target region 30 in the order of the closest distance between the user 200 and the robot 100. At this time, when a plurality of users 200 are located in the target region 30, the processor 130 may identify distance information of the target region 30 as a distance of the user 200 closer to the robot 100 among the plurality of users 200.

In addition, as one or more examples, the gaze order may be set based on an interaction score of the user 200 located in the target region 30. Here, the interaction score may be a score calculated based on the frequency, time, etc. of interactions that the user 200 performs on the robot 100. Hereinafter, one or more embodiments of the disclosure in which the gaze order is determined based on an interaction of each user 200 will be described.

Figure 7A:
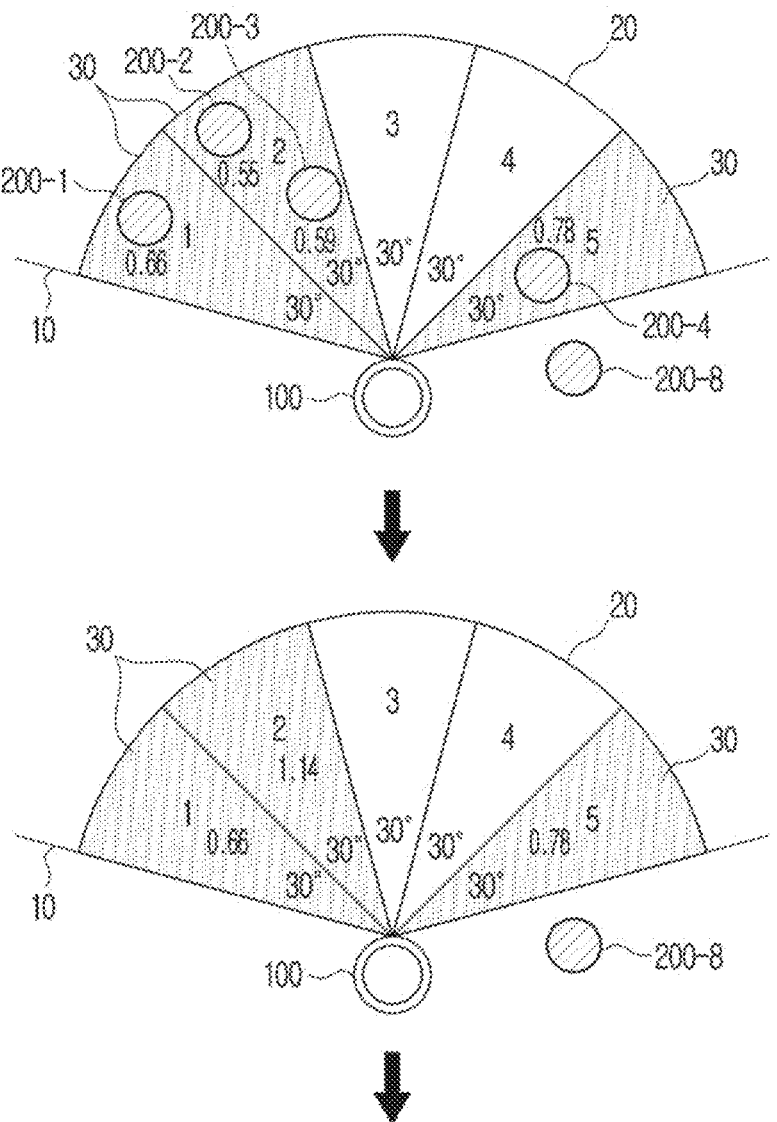
FIG. 7A is a diagram illustrating a method of determining a gaze order based on an interaction score according to one or more embodiments of the disclosure.
Figure 7B:
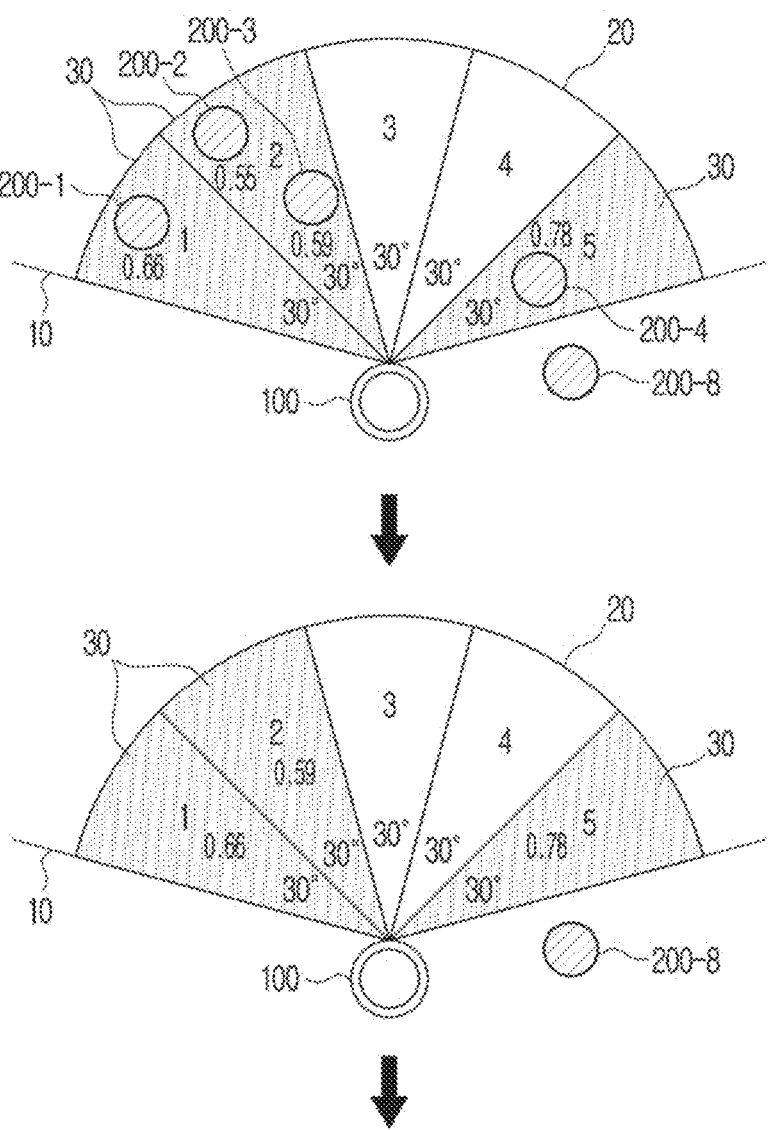
FIG. 7B is a diagram illustrating a method of determining a gaze order based on an interaction score according to one or more embodiments of the disclosure.

FIG. 6 is a flowchart illustrating a method of determining a gaze order based on an interaction score according to one or more embodiments of the disclosure. FIGS. 7A and 7B are diagrams illustrating a method of determining a gaze order based on an interaction score according to one or more embodiments of the disclosure. Operations S605 and S635 to S655 shown in FIG. 6 may respectively correspond to operations S310 to S360 shown in FIG. 3.

The processor 130 may first acquire interaction information of a plurality of users 200. In this regard, according to one or more embodiments of the disclosure, the processor 130 may identify a gaze duration of a plurality of users 200 toward the robot 100 based on an image acquired through the camera 110. (S610). Specifically, the processor 130 may recognize each user's face or directly detect the user's eyes based on a plurality of images acquired through the camera 110. For example, the processor 130 may detect human eyes in an image using the AdaBoost algorithm, HOG (Histogram of Oriented Gradients) algorithm, Haar Cascade algorithm, etc. In addition, the processor 130 may track the eyes of users detected within a plurality of images to identify whether each user gazes at the robot 100 and a time spent gazing at the robot 100.

In addition, the processor 130 may identify the number of voice inputs to the robot 100 by a plurality of users 200 based on a user's voice acquired through a microphone of the robot 100 (S615). Specifically, the processor 130 may recognize the voices of a plurality of users 200 input through the microphone of the robot 100, matches each user to the recognized user voice, and then identify the number of voice inputs by a plurality of users 200. To this end, the processor 130 may use a Hidden Markov Models (HMM) algorithm, a Long Short-Term Memory (LSTM) model, a CNN model, or a Transformer model.

At this time, the processor 130 may calculate an interaction score of a plurality of users 200 based on the identified gaze duration and number of voice inputs (S620). Specifically, the processor 130 may calculate an interaction score corresponding to each user's gaze duration and number of voice inputs. As one or more examples, the processor 130 may calculate a first interaction score corresponding to each user's gaze duration on the robot 100. In particular, the processor 130 may calculate the first interaction score as a higher value as the user's gaze duration for the robot 100 is longer. In addition, the processor 130 may calculate a second interaction score corresponding to the number of voice inputs of each user for the robot 100. In particular, the processor 130 may calculate the second interaction score as a higher value as the number of voice inputs increases.

In addition, the processor 130 may identify the number of touch inputs of the user 200 input through a display of the robot 100, and calculate a third interaction score corresponding to the identified number of touch inputs for each user 200.

The processor 130 may calculate an interaction score for each user by adding the first and second interaction scores. Referring to FIGS. 7A and 7B, the processor 130 calculates interaction scores of 0.66, 0.55, 0.59, and 0.78, respectively, based on the gaze duration and number of voice inputs of four users 200-1 to 200-4 for the robot 100.

Also, the processor 130 may identify the interaction score corresponding to each target region based on the interaction score of at least one user located in each target region (S625).

As one or more examples, the processor 130 may identify the sum of the interaction scores of a plurality of users 200 located in each target region as a regional interaction score corresponding to each target region. Specifically, referring to FIG. 7A, the processor 130 may identify a regional interaction score corresponding to each target region based on the interaction scores 0.66, 0.55, 0.59, and 0.78 of four users 200-1 to 200-4. At this time, the processor 130 may identify 1.14, which is obtained by adding up the interaction scores 0.55 and 0.59 of two users, as the interaction score corresponding to the second target region in which the two users are located.

As another example, the processor 130 may identify an interaction score corresponding to the highest value among the interaction scores of a plurality of users 200 located in each target region as the interaction score corresponding to each target region. Specifically, referring to FIG. 7A, the processor 130 may identify the interaction score corresponding to the second target region in which two users are located as the user's interaction score (0.59) having a high value.

In addition, the processor 130 may determine a gaze order for the plurality of target regions 30 based on the interaction score corresponding to each identified target region (S630). Specifically, the processor 130 may determine the gaze order on the plurality of target regions 30 in the order, starting from the highest interaction score.

For example, as shown in FIG. 7A, when the interaction score corresponding to each target region is identified based on the sum of the interaction scores of a plurality of users 200 located in the target region, the processor 130 may determine a gaze order for the plurality of target regions 30 (i.e., the first, second, and fifth regions) as an order of the second region, the fifth region, and the first region.

As another example, as shown in FIG. 7B, when the interaction score corresponding to each target region is identified based on the interaction score corresponding to the highest value among the interaction scores of the plurality of users 200 located in each target region, the processor 130 may determine the gaze order for the plurality of target regions 30 (i.e., the first, second, and fifth regions) as an order of the fifth region, the first region, and the second region.

The processor 130 may determine the gaze order by considering both the distance between the user located in each target region and the robot 100 and the interaction score of each user. Specifically, the processor 130 may identify the main user having the highest interaction score among a plurality of users 200 based on the interaction scores of the plurality of users 200. At this time, the processor 130 may determine the gaze order such that a target region in which a main user is located as a first gaze target region. In addition, the processor 130 may determine the gaze order for the remaining target regions in the order of the closest distance between the user located in each target region 30 and the robot 100. However, the disclosure is not limited thereto, and the processor 130 may determine the gaze order in various ways based on the distance between the user located in each target region and the robot 100 and the interaction score of each user.

Hereinafter, for convenience of description of the disclosure, it is assumed that the processor 130 determines the gaze order for a plurality of target regions in the order of the fifth region, the first region, and the second region.

The processor 130 may rotate the robot 100 to sequentially gaze at a plurality of target regions based on the gaze order for the plurality of targets. For example, if the gaze order for the plurality of target regions in FIG. 5 is the order of the fifth region, the first region, and the second region, the processor 130 may control the driver to cause the robot 100 to first gaze at the fifth region, gaze at the first region, and finally gaze at the second region.

To this end, the processor 130 may identify a rotation direction and a rotation angle for each target region 30 in consideration of the gaze order. In particular, in order to control the driver so that the robot 100 gazes at another target region 30 after gazing at one target region 30 among the plurality of target regions 30, the processor 130 should identify a rotation direction and a rotation angle of the robot 100 for a target region 30 in next order in consideration of a location of a target region 30 in previous order in the gaze order.

Figure 10:
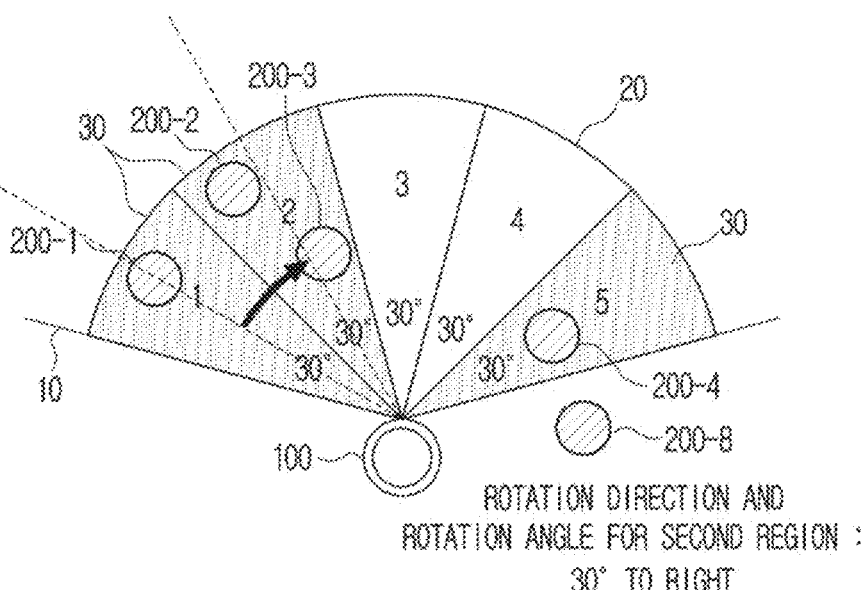
FIG. 10 is a diagram illustrating identifying a rotation direction and a rotation angle of a plurality of target regions according to a gaze order according to one or more embodiments of the disclosure.

FIG. 8 is a flowchart illustrating a control method of identifying a rotation direction and a rotation angle of a plurality of target regions according to a gaze order according to one or more embodiments of the disclosure. S510, S550 to S580 shown in FIG. 8 may correspond to S310, S330 to S360 shown in FIG. 3. FIGS. 9 and 10 are diagrams illustrating identifying a rotation direction and a rotation angle of a plurality of target regions according to a gaze order according to one or more embodiments of the disclosure.

Referring to FIG. 8, according to one or more embodiments of the disclosure, the processor 130 may identify a first target region 30 among the plurality of target regions 30 based on the gaze order and identify a rotation angle and a rotation direction of the robot 100 corresponding to the first target region 30 based on a location of the first target region 30 (S830).

Here, the first target region 30 may be the target region 30 corresponding to the first order in the gaze order. In addition, the rotation angle and the rotation direction corresponding to the first target region 30 may be a rotation angle and a rotation direction necessary for the robot 100 to face the first target region 30.

Specifically, the processor 130 may identify the rotation angle and the rotation direction corresponding to the first target region 30 based on a posture of the robot 100 at the time of identifying the plurality of target regions 30. At this time, the processor 130 may identify the location of the first target region 30 from the posture of the robot 100 at the time of identifying the plurality of target regions 30 and identify the rotation angle and the rotation direction corresponding to the first target region 30 based on the identified location of the first target region 30.

In particular, the processor 130 may identify the rotation angle and the rotation direction corresponding to the first target region 30 based on the predetermined angle used to divide the field angle 10 of the camera.

Referring to FIG. 9, the processor 130 may identify the first target region 30 as the fifth region in the gaze order and identify the location of the fifth region. After identifying the location of the fifth region located in the fifth of the plurality of regions 20, the processor 130 may identify the rotation angle and the rotation direction necessary to face the fifth region from the current posture of the robot 100. In addition, the processor 130 may identify the rotation angle for the fifth region as 60° and the rotation direction as the clockwise direction. At this time, the rotation angle (60°=2×30°) for the fifth region may be identified based on the predetermined angle (30°) used to divide the field angle of the camera.

After identifying the rotation direction and the rotation angle corresponding to the first target region 30, the processor 130 may identify the rotation direction and rotation angle for the remaining target region 30 (S840). At this time, the remaining target region 30 may be a target region 30 corresponding to the order after the first target region 30 in the gaze order.

In this regard, according to one or more embodiments of the disclosure, the processor 130 may identify the remaining rotation angle and the remaining rotation direction of the robot 100 corresponding to the remaining target region 30 among the plurality of target regions 30 based on the location of the target region 30 in previous order of the remaining target region 30 and the location of the remaining target region 30 (S840).

In the case of the remaining target region 30 after the first target region 30, the processor 130 should control the robot 100 to face the specific target region 30 and then sequentially control the robot 100 to face another target region 30, and thus, the processor 130 should identify the rotation direction and the rotation angle for each of the target region 30 in consideration of the location of the target region 30 in previous order.

Specifically, for the remaining target regions 30, the processor 130 may identify the location of the target region 30 corresponding to the previous order of the order corresponding to each target region 30 in the gaze order. Also, based on the location of the target region 30 in previous order and the location of the target region 30 in the next order, the processor 130 may identify a required rotation angle and rotation direction to cause the robot 100 to gaze at the target region 30 in previous order and then gaze at the target region 30 in the next order. At this time, the processor 130 may identify the rotation angle and the rotation direction corresponding to the remaining target region 30 based on the predetermined angle used to divide the field angle 10 of the camera.

Referring to FIGS. 9 and 10, the processor 130 may identify the rotation direction and the rotation angle for the first target region 30 corresponding to the first order in the gaze order and then identify the rotation direction and the rotation angle for the remaining target regions 30 (i.e., the first and second regions) after the first order. At this time, the processor 130 may identify the first region as the second target region 30 and the second region as the third target region 30 based on the gaze order.

Referring to FIG. 9, the processor 130 may consider the location of the first region and the location of the fifth region (i.e., the first target region 30) which is in previous order (i.e., first) of the first region to identify the rotation direction and the rotation angle of the robot 100 for the first region which is the second target region 30 in the gaze order.

Specifically, the processor 130 may identify the rotation direction and the rotation angle for rotating the robot 100 from the fifth region to the first region, in consideration of the location of the fifth region and the location of the first region. At this time, the processor 130 may identify the rotation direction for the first region as a counterclockwise direction and the rotation angle as 120°.

Thereafter, referring to FIG. 10, the processor 130 may consider the location of the second region and the location of the first region (i.e., the second target region 30) which is in previous order (i.e., second) of the second region to identify the rotation direction and the rotation angle of the robot 100 for the second region, which is the third target region 30.

Specifically, the processor 130 may identify a rotation direction and a rotation angle for rotating the robot 100 from the first region to the second region in consideration of the location of the first region and the second region. In addition, the processor 130 may identify the rotation direction for the second region as the clockwise direction and the rotation angle as 30°.

The processor 130 may control the driver so that the robot 100 rotates based on the identified rotation angle and the rotation direction (S330, S550).

At this time, the processor 130 may control the driver so that the robot 100 faces each target region 30 based on the rotation angle and the rotation direction. As described above, the processor 130 may control the driver so that the head of the robot 100 or the body of the robot 100 may sequentially gaze at a plurality of target regions 30.

Accordingly, a plurality of users 200 located in each target region 30 may recognize that the robot 100 actively interacts with the users 200. In particular, in the case of the existing robot 100, when a plurality of users 200 are located around the robot 100, the robot 100 may gaze at only a specific user 200 or indiscriminately gaze at the user 200, and thus, it was difficult for a plurality of users 200 to feel that they appropriately interact with the robot 100. However, in the disclosure, the robot 100 may not gaze at only a specific user 200 among the plurality of users 200 but sequentially and repeatedly gaze at a plurality of users 200, so that the plurality of users 200 that use the robot 100 may feel that they actively and smoothly interact with the robot 100.

The processor 130 may control the robot 100 to gaze at each target region 30 for a predetermined time. Hereinafter, the time set for the robot 100 to gaze at the target region 30 will be referred to as the gaze duration. When the robot 100 rotates toward the target region 30 by controlling the driver, the processor 130 may control the driver so that the robot 100 stops toward the target region 30 for a predetermined gaze duration. Accordingly, the robot 100 may stand to face the target regions 30 in a stationary state for the predetermined gaze duration with respect to the plurality of target regions 30.

The gaze duration for each target region 30 may be set to be different. As one or more examples, the processor 130 may identify an interaction score corresponding to each target region based on an interaction score of at least one user 200 located in each target region 30 and determine a regional gaze duration for each target region based on the interaction score corresponding to each target region. In particular, the processor 130 may determine the regional gaze duration for each target region in proportion to the interaction score corresponding to each target region. That is, the processor 130 may set the gaze duration for the target region to be longer as the interaction score corresponding to the target region increases.

In addition, as one or more examples, the processor 130 may set the gaze duration for each target region 30 based on the number of users 200 located in each target region. In particular, the processor 130 may determine the gaze duration for each target region in proportion to the number of users 200 located in each target region 30. That is, the processor 130 may set the gaze duration for the target region to be longer as the number of users 200 located in the target region 30 increases.

The processor 130 may control the driver so that the robot 100 gazes at each target region for the determined gaze duration.

The processor 130 may control the driver so that the robot 100 gazes at the plurality of target regions 30 repeatedly according to the gaze order based on the identified (first) rotation angle and the (first) rotation direction. To describe the above example again, if the gaze order is an order of the fifth region, the first region, and the second region, the processor 130 may control the driver to cause the robot 100 to face the fifth region again after controlling the driver to cause the robot 100 to gaze at the second region which is the last order according to the gaze order. More specifically, if the gaze order of the fifth region, the first region, and the second region is called 1 period (or 1 cycle), the processor 130 may control the driver to cause the robot 100 to gaze at the fifth region, the first region, and the second region periodically (or repeatedly). The gaze order may include a gaze order for the target region 30 for a plurality of periods. That is, FIGS. 9 and 10 show that only one gaze order of one period is included in the gaze order, but depending on the embodiment, even a gaze order of a second period and a third period after the first period may also be included.

The processor 130 may identify a new user 210 while the robot 100 rotates based on the identified rotation angle and rotation direction. Here, the new user 210 may be a user 200 that was not previously recognized by the processor 130 but is newly recognized. For example, as the robot 100 rotates, the field angle 10 of the camera may change, and at this time, the user 200 newly recognized within the changed field angle 10 may correspond to the new user 210. In particular, the new user 210 may also be a user 200 identified as being included in the same user group as a plurality of users 200.

Alternatively, the new user 210 may have been recognized as the user 200 continuously located around the robot 100 by the processor 130 but identified as not being included in the same user group and excluded. At this time, if the excluded user 200 is identified as having belatedly joined the same user group through interaction with a plurality of users 200 included in the user group, the processor 130 may recognize the excluded user 200 as a new user 210.

According to one or more embodiments of the disclosure, when the new user 210 is recognized based on an image acquired through the camera while the robot 100 is rotating, the processor 130 may adjust the gaze order so that a new target region 31 (e.g. generate a second gaze order), in which the new user 210 is located among the plurality of regions 20 within the field angle 10 of the camera of the rotated robot 100, is included in the gaze order (S360).

Specifically, when the new user 210, other than the plurality of users 200 that have been previously recognized, is recognized according to rotation of the robot 100, the processor 130 may control the robot 100 to gaze at the new user 210. In particular, if the new user 210 is identified as being included in the same user group as the plurality of existing users 200, the processor 130 may include the new user 210 in the user group and may control the robot 100 to gaze at the new user 210 as well together with the plurality of users 200.

To this end, the processor 130 may adjust the existing gaze order. In particular, when the new user 210 is located in the new target region 31 rather than the plurality of existing identified target regions 30, the processor 130 may adjust the existing gaze order. In addition, when the new target region 31 is not identified in the plurality of existing identified regions 20 but is identified in a different location (or a plurality of different regions 20), the processor 130 may adjust the gaze order so that the new target region 31 is included in the gaze order.

Hereinafter, embodiments of the disclosure related thereto will be described in detail with reference to FIGS. 11 to 16.

Figure 11:
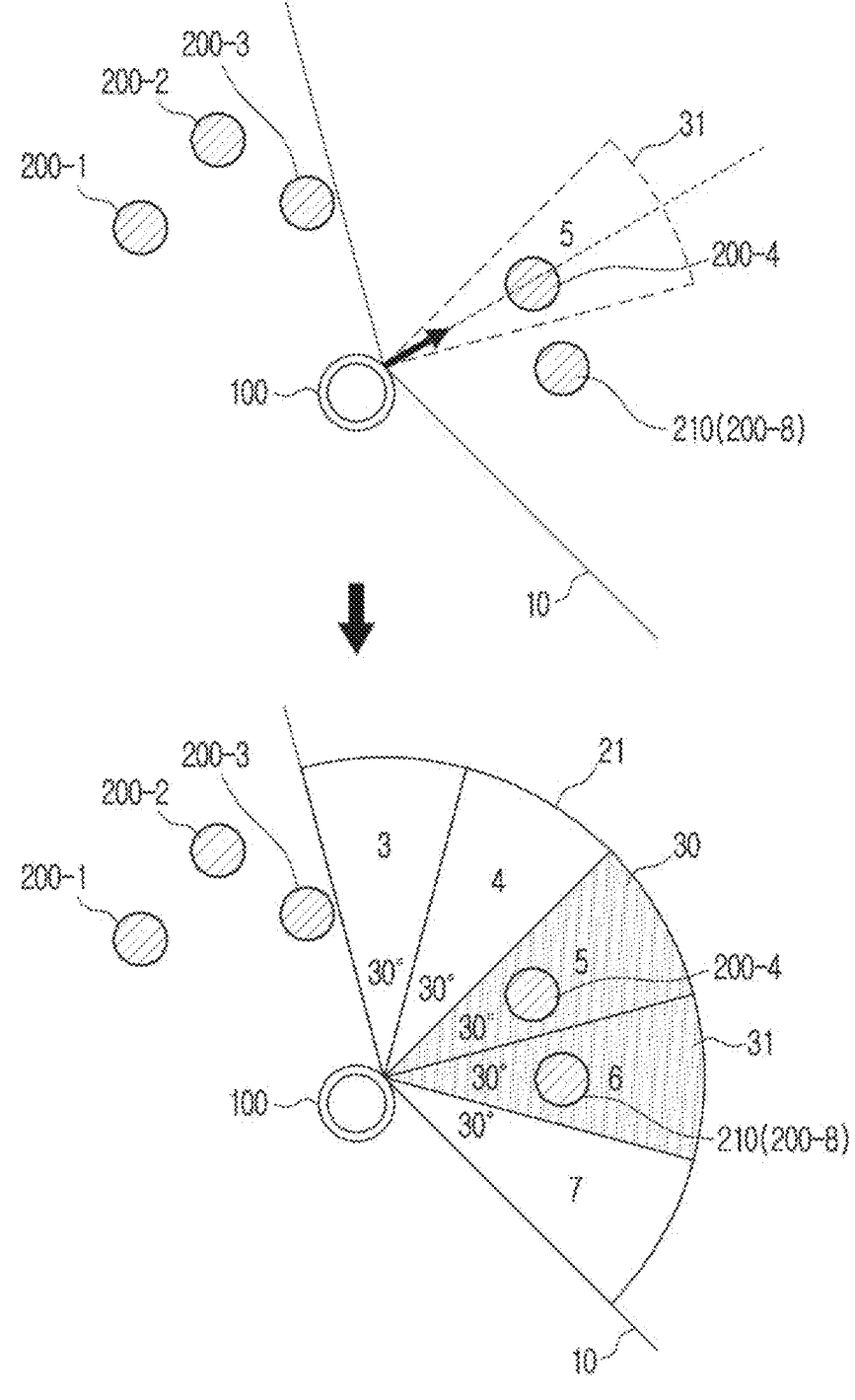
FIG. 11 is a diagram illustrating recognition of a new region in which a new user is located based on recognition of the new user according to one or more embodiments of the disclosure.

FIG. 11 is a diagram illustrating recognition of a new region in which a new user is located when the new user is recognized according to one or more embodiments of the disclosure. FIG. 12 is a flowchart illustrating a control method of re-identifying a (second) rotation angle and a (second) rotation direction of a plurality of target regions when a new user is recognized. S1210, S1220, S1230, S1270, and S1280 shown in FIG. 12 may correspond to S310, S320, S330, S350, and S360 shown in FIG. 3, respectively.

The processor 130 may recognize the new user 210 located around the robot 100 based on an image acquired through a camera while the robot 100 rotates (S1240). Specifically, the processor 130 may store feature information on a plurality of users 200 in a memory and recognize the new user 210 within the image acquired by the robot 100 through the camera based on the stored feature information. After acquiring the feature information on the user 200 in the image, the processor 130 may compare the feature information on the user 200 with feature information on the plurality of users 200 stored in the memory to identify whether the user 200 is one of the plurality of existing recognized users 200 or the new user 210. In particular, if the acquired feature information is identified as being different from the feature information stored in the memory, the processor 130 may recognize that the user 200 corresponding to the acquired feature information is the new user 210.

Referring to FIG. 12, when the new user 210 is recognized (S1240), the processor 130 may divide the field angle 10 of the camera of the robot 100 at a predetermined angle to identify a plurality of regions 20 (S1250). In addition, the robot 100 may identify the new target region 31 in which the new user 210 is located in the plurality of regions 20. In this regard, the description of the disclosure given above may be applied in the same manner, so a detailed description will be omitted.

Specifically, referring to FIG. 11, the processor 130 may acquire a plurality of images through a camera while the robot 100, rotated according to the gaze order, gazes at the fifth region. Also, the processor 130 may recognize the new user 210 around the robot 100 based on the acquired image. The new user 210 may be the user 200-8 located outside a field angle range of the camera before the robot rotates.

At this time, when the new user 210 is recognized, the processor 130 may divide the field angle 10 of the camera at a predetermined angle to identify the plurality of regions 21 in a state in which the robot 100 gazes at the fifth region. In addition, the processor 130 may identify a sixth region as the target region 30 in which the new user 210 is located among the plurality of regions 21.

Referring to FIG. 11, the plurality of regions 20 identified in a state in which the robot 100 is rotated may be different from the plurality of existing regions 20 in that the plurality of regions 20 are identified while the robot 100 is gazing at the target region 30. However, for convenience of description of the disclosure, regarding the plurality of new regions 21, one or more embodiments of the disclosure is described using overlapping reference numbers added to the plurality of existing regions 20.

In addition, the processor 130 may adjust the gaze order so that the new target region 31 is included in the gaze order (S1260). At this time, the processor 130 may adjust the gaze order based on a distance between the new user 210 and the robot 100 or an interaction score of the new user 210.

As one or more examples, the processor 130 may adjust the gaze order between the target region 30 the robot 100 has not gazed at yet (or a region scheduled to be gazed) (hereinafter, an unattended target region) and the new target region 31 in the gaze order.

As one or more examples, the processor 130 may adjust the gaze order between the unattended target region and the new target region 31 based on an interaction score of the user 200 located in the unattended target region and the new user 210 located in the new target region 31. The processor 130 may calculate the interaction score of the new user 210 located in the new target region 31. Specifically, based on the image acquired through the camera 110 while the robot 100 is rotated, the processor 130 may identify a gaze duration of the new user 210 for the robot 100 based on the image acquired through the camera 110 while the robot 100 is rotated. In addition, the processor 130 may identify the number of voice inputs to the robot 100 of the new user 210 based on a voice of the new user 210 acquired through a microphone. In addition, the processor 130 may also identify the number of touch inputs of the new user 210 input through a display. In addition, the processor 130 may calculate an interaction score of the new user based on the gaze duration and the number of voice inputs (and the number of touch inputs). In this regard, the description of the embodiment of the disclosure given above may be applied equally, so detailed description will be omitted.

The processor 130 may compare the interaction scores corresponding to the unattended target region and the new target region 31, respectively, and adjust the gaze order between the unattended target region and the new target region 31. Because the description of the embodiment of the disclosure described above may be equally applied to the method of adjusting the gaze order between the new target region 31 and the unattended target region based on the interaction score, detailed description will be omitted.

In addition, the processor 130 may adjust the gaze order between the unattended gaze target region and the new target region 31 by comparing the distance between the user 200 located in the unattended target region and the robot 100 and the distance between the user 200 and the robot 100 located in the new target region 31. In this regard, the description of the embodiment of the disclosure given above may be applied equally, so detailed description will be omitted.

Figure 13:
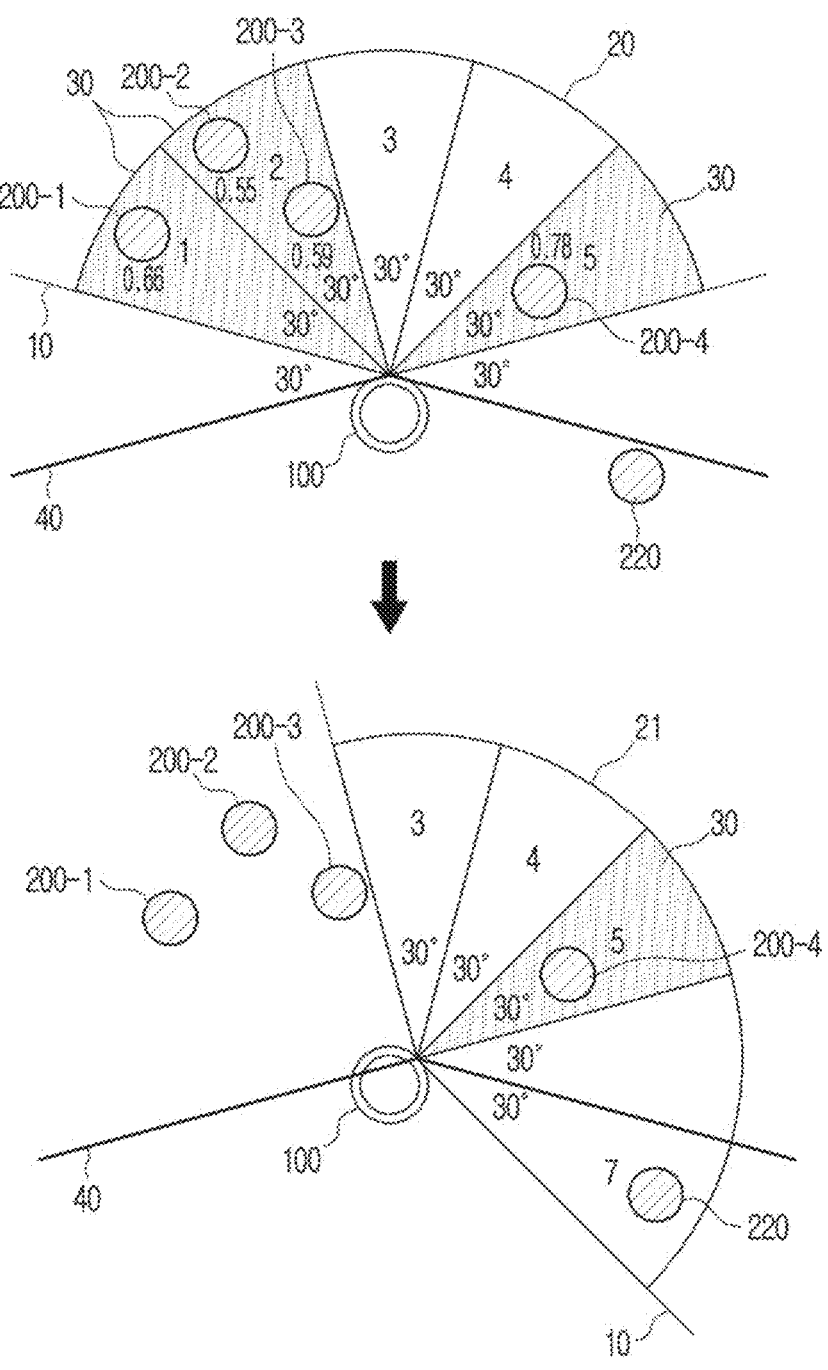
FIG. 13 is a diagram illustrating that a new target region is not included in a gaze order based on that a rotation angle of a robot for gazing at the new target region is equal to or greater than a predetermined critical angle according to one or more embodiments of the disclosure.

FIG. 13 is a diagram illustrating that a new target region is not included in a gaze order when a rotation angle of a robot for gazing at a new target region according to one or more embodiments of the disclosure is greater than or equal to a predetermined critical angle.

according to one or more embodiments of the disclosure, when a rotation angle of the robot 100 for gazing at the new target region 31 is less than a predetermined critical angle, the processor 130 may adjust the gaze order so that the new target region 31 is included in the gaze order. Accordingly, if the rotation angle of the robot 100 for gazing at the new target region 31 is equal to or greater than the predetermined critical angle, the processor 130 may not include the new target region 31 in the gaze order and maintain the gaze order.

Specifically, if the processor 130 adjusts the gaze order to include the new target region 31 whenever a new user and the new target region 31 in which the new user is located are identified while the robot 100 is rotating, a problem may occur in which opportunities for a plurality of existing users to interact with the robot 100 are reduced (or waiting time for interaction is increased).

Therefore, the processor 130 may set a critical angle for the rotation angle of the robot 100 at a time of first determining the gaze order. Also, whenever a new user is recognized, the processor 130 may identify whether the rotation angle of the robot 100 for gazing at the new target region 31 in which the new user is located is within the set critical angle. For example, the processor 130 may set a critical range 40 at the time of first determining the gaze order. Here, the critical range 40 may be set based on the posture of the robot 100, the field angle range 10, the angle of the plurality of regions 20, the critical angle of the rotation angle of the robot, etc. at the time of first determining the gaze order.

In addition, the processor 130 may identify whether the location of the new target region 31 is within the predetermined critical range 40, thereby identifying whether the rotation angle of the robot 100 to gaze at the new target region 31 is within the set critical angle. If the location of the new target region 31 is identified as being within the predetermined critical range 40, the processor 130 may adjust the gaze order so that the new target region 31 is included in the gaze order. If the location of the new target region 31 is identified as being outside the predetermined critical range 40, the processor 130 may not include the new target region 31 in the gaze order and maintain the gaze order.

Referring to FIG. 13, the processor 130 may set the critical range 40 related to the rotation angle of the robot 100 to 210° at the time the robot 100 determines a first gaze order. At this time, the processor 130 may identify the target region in which the newly recognized new user 220 is located among a plurality of new regions 21 while the robot 100 gazes at the user in the fifth region. At this time, when the new target region 31 is a seventh region, the processor 130 may identify the seventh region as being outside the set critical range 40 (210°). Accordingly, the processor 130 may determine that the robot 100 does not gaze at the new target region 31 (the seventh region). That is, the processor 130 may not include the new target region 31 (the seventh region) in the gaze order and may maintain the gaze order of the existing target regions (the first, second, and fifth regions) as is.

After adjusting the gaze order, the processor 130 may re-identify the rotation angle and the rotation direction of the robot 100 based on the location of the new target region 31 and the adjusted gaze order (S1270). Also, the processor 130 may control the driver so that the robot 100 rotates based on the re-identified rotation angle and the rotation direction (S1280).

For example, when a new user 210 is recognized based on an image acquired through the camera of the rotated robot 100, the processor 130 may identify a rotation angle and a rotation direction of the robot 100 corresponding to the new target region 31 based on the location of the new target region 31 in which the new user 210 is located among the plurality of regions 20. In addition, the processor 130 may control the driver so that the robot 100 rotates based on the rotation angle and the rotation direction of the robot 100 corresponding to the identified target region 30.

Specifically, referring to FIG. 11, if the new user 210 identified while the robot 100 is gazing at the fifth region is identified as being located in the sixth region, the processor 130 may identify the location of the newly identified target region 31 (i.e., the sixth region). At this time, the processor 130 may identify the sixth region as being located in the fourth among the plurality of newly identified regions 21, and identify a rotation angle and a rotation direction of the sixth region as 30° clockwise. Also, the processor 130 may control the driver to cause the robot 100 to also gaze at the newly identified new target region 31 as well as the plurality of existing target regions 30 based on the rotation angle and the rotation direction for the identified sixth region.

However, when the gaze order is adjusted as the new target region 31 is identified, the rotation direction and rotation angle with respect to the existing target region 30 may change. In addition, the processor 130 should identify the rotation direction and the rotation angle of the robot 100 for the new target region 31 in consideration of even the location of the other target region 30 as well as the location of the new target region 31 according to the order of the new target region 31 in the adjusted gaze order.

To this end, as one or more examples, the processor 130 may identify a next target region of a next order of the target region 30 at which the rotated robot 100 is gazing, among an unattended target region and the new target region 31 based on the adjusted gaze order.

Here, the next target region may be a target region 30 in the next order of the region at which the robot is gazing at the time when the processor 130 recognizes the new user 210 in a state in which the robot 100 is rotated and identify the new target region in which the new user 210 is located. At this time, the next target region may be identified based on the adjusted gaze order.

Specifically, referring to FIG. 11, while the rotated robot 100 gazes at the fifth region among the plurality of target regions 30, the processor 130 recognizes the new user 210 around the robot 100. At this time, the processor 130 may adjust the gaze order to include the sixth region, which is the new target region 31, in the gaze order. In addition, the processor 130 may identify the target region 30 in the next order after the fifth region that the robot 100 is gazing at in the adjusted gaze order.

Figure 16:
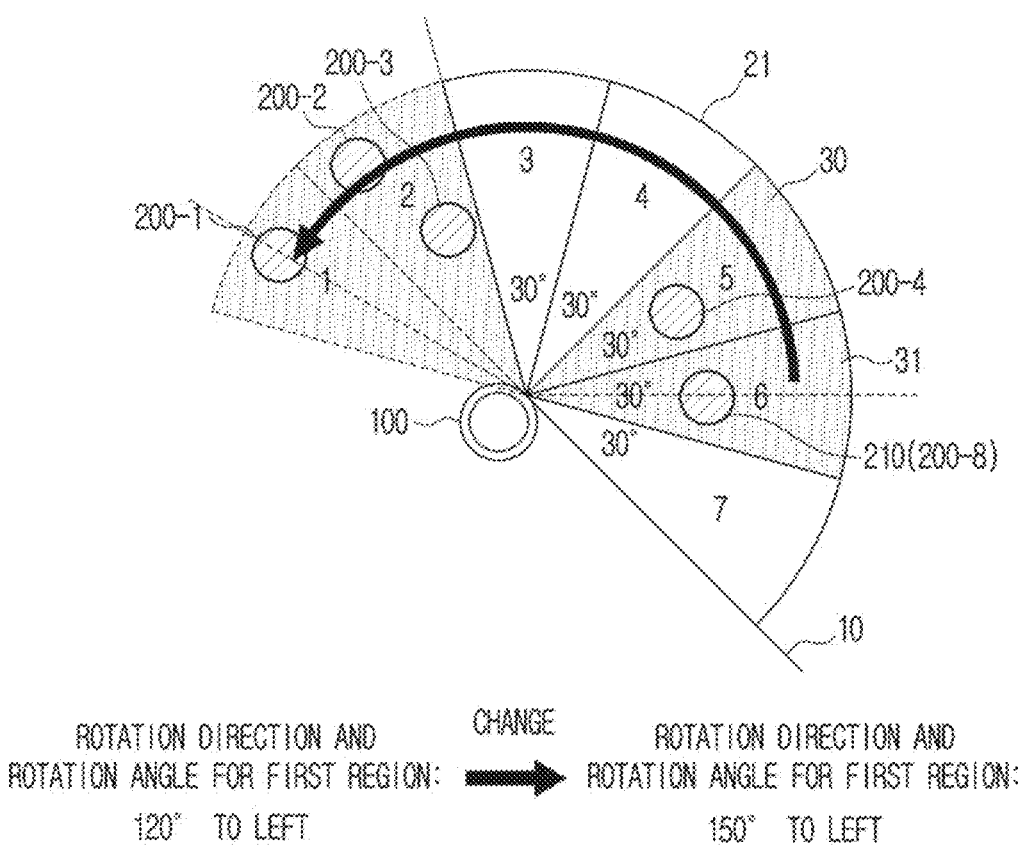
FIG. 16 is a diagram illustrating re-identifying a rotation direction and a rotation angle of a robot based on a location of a new target region according to one or more embodiments of the disclosure.

FIGS. 14, 15, and 16 are diagrams illustrating re-identification of a rotation direction and a rotation angle of a robot based on a location of a new target region according to one or more embodiments of the disclosure.

For example, referring to FIG. 14, when the robot 100 adjusts the existing gaze order (fifth region→first region→second region) to include the sixth region, which is the new target region 31, the next target region within the adjusted gaze order (fifth region→first region→second region→sixth region) may be the first region in the order after the fifth region. That is, even if the gaze order adjusted to be the same as the existing gaze order is followed, the processor 130 may control the driver to cause the robot 100 to gaze at the first region after gazing at the fifth region and rotate the robot 100 toward the first region.

Referring to FIG. 15, when the robot 100 adjusts the existing gaze order (fifth region*first region*second region) to include the sixth region, which is the new target region 31, a next target region within the adjusted gaze order (fifth region*sixth region*first region*second region) may be the sixth region in the order after the fifth region. In this case, the processor 130 may control the driver to cause to robot 100 to rotate toward the sixth region to gaze at the sixth region, not the first region, after gazing at the fifth region, according to the adjusted gaze order.

The processor 130 may re-identify the rotation angle and the rotation direction of the robot 100 corresponding to the next target region based on a location of the next target region. Also, the processor 130 may re-identify a rotation angle and a rotation direction of the robot 100 corresponding to the remaining target region 30 after the next target region among the unattended target region and the new target region 31 based on the location of the target region 30 in previous order of the remaining target region 30 and the location of the remaining target region 30.

Specifically, the processor 130 may identify the rotation angle and the rotation direction corresponding to the next target region based on the posture of the robot 100 at the time of identifying the new target region 31. At this time, the processor 130 may identify the location of the next target region based on the location of the target region 30 at which the robot 100 is gazing at the time of identifying the new target region 31. In addition, the processor 130 may identify the rotation angle and the rotation direction corresponding to the next target region based on the location of the identified next target region. In particular, the processor 130 may identify the rotation angle and the rotation direction corresponding to the first target region 30 based on a predetermined angle used to divide the field angle 10 of the camera.

Referring to FIG. 14, the processor 130 may identify the next target region in the adjusted gaze order as the first region and identify the location of the first region. In particular, the processor 130 may identify the location of the unidentified first region within the field angle 10 based on the rotation direction and rotation angle with respect to the first region before the gaze order is adjusted. In addition, the processor 130 may identify the rotation angle and the rotation direction necessary for the robot 100, which gazes at the fifth region, to face the first region, which is the next target region. In addition, the processor 130 may identify the rotation angle for the first region as 120° and the rotation direction as the clockwise direction. At this time, the rotation angle (120°=4×30°) for the first region may be identified based on the predetermined angle (30°) used to divide the field angle 10 of the camera. That is, the rotation direction and rotation angle of the robot 100 with respect to the first region may not be changed in that the next target region after the fifth region is maintained as the first region even within the adjusted gaze order.

Referring to FIG. 15, the processor 130 may identify the next target region in the adjusted gaze order as the sixth region and identify the location of the sixth region. The processor 130 may identify a plurality of regions 20 within the field angle 10 of the camera while the robot 100 is gazing at the fifth region, and identify the location of the sixth target region 30 within the plurality of identified regions 20. In addition, the processor 130 may identify the rotation angle and the rotation direction necessary for the robot 100, which is gazing at the fifth region, to face the sixth region, which is the next target region. In addition, the processor 130 may identify the rotation angle for the sixth region as 30° and the rotation direction as the clockwise direction.

At this time, the rotation angle (30°=1×30°) for the sixth region may be identified based on the predetermined angle (30°) used to divide the field angle 10 of the camera. That is, in that the next target region after the fifth region has changed from the first region to the sixth region even within the adjusted gaze order, the angle and direction at which the robot 100 is to be rotated by controlling the driver by the processor 130 after gazing at the fifth region have changed.

After identifying the next rotation direction and next rotation angle corresponding to the next target region, the processor 130 may identify the rotation direction and rotation angle for the remaining target region 30. At this time, the remaining target region 30 may be the target region 30 corresponding to an order after the next target region in the gaze order. The description of the disclosure of identifying the rotation direction and rotation angle for the remaining target region 30 after the first target region 30 described above may be equally applied.

In particular, if the next target region is an unattended target region, the processor 130 may identify the rotation angle and the rotation direction of the robot 100 corresponding to the new target region 31 based on the location of the new target region 31 and the location of the unattended target region before the new target region 31. Specifically, the next target region is the unattended target region, and the processor 130 may identify the rotation direction and rotation angle for the new target region 31 in consideration of the location of the target region 30 in previous order of the new target region 31 added to the adjusted gaze order and the location of the new target region 31.

Referring back to FIG. 14, the processor 130 may identify the gaze order of the sixth region within the adjusted gaze order. In addition, the processor 130 may identify the second region as the target region 30 having the third gaze order, which is the order before the sixth region having the fourth gaze order. After identifying the location of the second region, the processor 130 may identify the rotation direction and the rotation angle for rotating the robot 100 from the second region to the sixth region based on the location of the second region and the location of the sixth region.

Specifically, the processor 130 may identify the location of the second region based on the rotation angle and the rotation direction with respect to the identified second region before the gaze order is adjusted. Also, the processor 130 may identify the rotation direction and the rotation angle for the robot 100 to rotate to gaze the sixth region after gazing at the second region, in consideration of the location of the sixth region in the plurality of regions 21 based on the location of the second region. At this time, the processor 130 may identify the rotation direction and rotation angle of the robot 100 with respect to the sixth region as being 120° clockwise.

Also, the processor 130 may control the driver to rotate the robot 100 to gaze at the new target region 31 based on the rotation angle and the rotation direction (i.e., 120° clockwise) of the robot 100 corresponding to the new target region 31 (i.e., the sixth region), after gazing at an unattended target region (i.e., the second region) before the new target region 31 according to the adjusted gaze order.

If the next target region is the new target region 31, the processor 130 may identify the rotation angle and rotation direction of the robot 100 corresponding to the new target region 31 based on the location of the new target region 31 and re-identify the rotation angle and rotation direction of the robot 100 corresponding to the unattended target region based on the location of the new target region 31.

Specifically, the next target region may be the new target region 31, and the processor 130 may re-identify the rotation direction and rotation angle of the target region 30 in order after the new target region 31 added to the adjusted gaze order in consideration of the location of the new target region 31.

Referring to FIGS. 15 and 16, the processor 130 may identify the target region 30 having the next order of the sixth region within the adjusted gaze order. In addition, the processor 130 may identify the first region as the target region 30 having the third gaze order, which is the order after the sixth region having the second gaze order. Therefore, after identifying the location of the sixth region, the processor 130 may identify the rotation direction and the rotation angle for rotating the robot 100 from the sixth region to the first region based on the location of the first region and the location of the sixth region.

Specifically, the processor 130 may identify the location of the first region based on the rotation angle and the rotation direction with respect to the identified first region before the gaze order is adjusted. Also, the processor 130 may identify a rotation direction and a rotation angle for the robot 100 to rotate to gaze at the first region after gazing at the sixth region in consideration of the location of the first region based on the location of the sixth region in the plurality of regions 21. At this time, the processor 130 may identify the rotation direction and rotation angle of the robot 100 with respect to the first region as being 150° counterclockwise.

Also, the processor 130 may control the driver to rotate the robot 100 to gaze at the new target region 31 (i.e., the sixth region) and then gaze at the first region based on the rotation angle and the rotation direction (i.e., 150° counterclockwise) of the robot 100 corresponding to the target region 30 (i.e., the first region) in the next order according to the adjusted gaze order.

Figure 17:
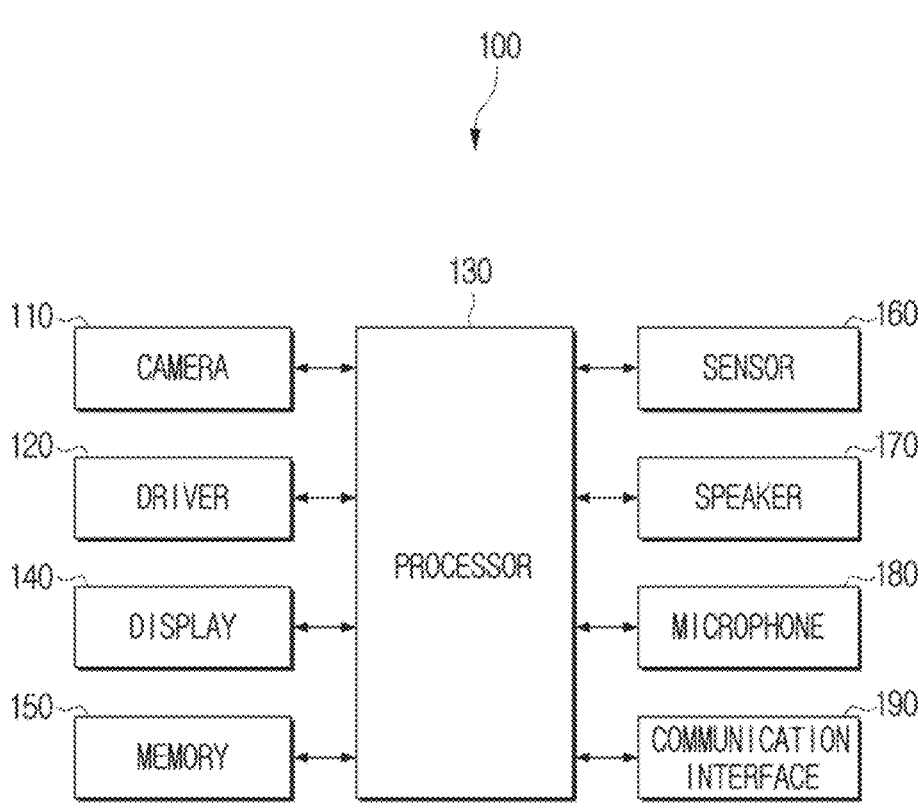
FIG. 17 is a detailed configuration diagram of a robot according to one or more embodiments of the disclosure.

FIG. 17 is a detailed configuration diagram of the robot according to one or more embodiments of the disclosure.

Referring to FIG. 17, the robot 100 includes the camera 110, the driver 120, a display 140, a memory 150, a sensor 160, a speaker 170, a microphone 180, and a communication interface 190. Detailed descriptions of components illustrated in FIG. 12 that overlap those shown in FIG. 2 will be omitted.

The display 140 may display various visual information. As one or more examples, the display 140 may display various information requested by a plurality of users. To this end, the display 140 may be implemented as a display including a self-luminous device or a display including a non-self-luminous device and a backlight. For example, the display 140 may be implemented as various types of displays, such as liquid crystal display (LCD), organic light emitting diodes (OLED) display, light emitting diodes (LED), micro LED, mini LED, plasma display panel (PDP), and quantum dot (QD) display, quantum dot light-emitting diodes (QLED), etc.

The display 140 may also include a driving circuit and a backlight unit that may be implemented in the form of a-si TFT, low temperature poly silicon (LTPS) TFT, or organic TFT (OTFT).

The display 140 may be implemented as a touch screen combined with a touch panel and a touch sensor, a flexible display, a rollable display, a 3D display, and a display in which a plurality of display modules are physically connected. When the display 140 is implemented as a touch screen together with a touch panel, the display 140 may function as an output unit that outputs information between the robot 100 and the user and as an input unit that provides an input interface between the robot 100 and the user. In particular, the processor may calculate interaction scores for a plurality of users based on touch input input through the display 140.

The memory 150 may store data necessary for various embodiments of the disclosure. As one or more examples, map data regarding a driving space in which the robot 100 is located may be stored in the memory 150. The memory 150 may be implemented as a memory embedded in the robot 100 or as a memory detachable from the robot 100 depending on a data storage purpose. For example, data for driving the robot 100 may be stored in a memory embedded in the robot 100, and data for expanding functions of the robot 100 may be stored in a memory that is detachable from the robot 100.

A memory embedded in the robot 100 may be implemented as at least one of volatile memory (e.g., dynamic RAM (DRAM), static RAM (SRAM), or synchronous dynamic RAM (SDRAM), etc.) and non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g. NAND flash or NOR flash, etc.), a hard drive, or a solid state drive (SSD)).

In addition, a memory that is detachable from the robot 100 may be implemented as a memory card (e.g., compact flash (CF), secure digital (SD), micro secure digital (Micro-SD), mini secure digital (Mini-SD), extreme digital (xD), multi-media card (MMC), etc.), external memory (e.g., USB memory) that may be connected to a USB port, etc.

According to one or more examples, the memory 150 may store information on a plurality of neural network (or artificial intelligence) models. Here, storing information on a neural network model may refer to storing various information related to the operation of the neural network model, such as information on at least one layer included in a neural network model, information on parameters used in each of at least one layer, bias, etc. However, of course, depending on the implementation type of the processor 130, information on a neural network model may be stored in an internal memory of the processor 130. For example, if the processor 130 is implemented as dedicated hardware, the information on the neural network model may be stored in the internal memory of the processor 130.

The robot 100 includes at least one sensor 160. At least one sensor 160 may include a sensor that detects objects around the robot 100 described above (e.g., a lidar sensor, a ToF sensor, etc.) and a sensor that detects the posture of the robot 100 (e.g., IMU sensor, etc.), in addition to at least one of gesture sensors, gyro sensors, barometric pressure sensors, magnetic sensors, acceleration sensors, grip sensors, proximity sensors, color sensors (e.g. red, green, and blue (RGB) sensors), biometric sensors, temperature/humidity sensors, illumination sensors, or ultra violet (UV) sensors. The processor may detect a plurality of users around the robot 100 based on sensing information acquired through at least one sensor 160 and identify a distance between the robot 100 and the user 200.

The speaker 170 may output an acoustic signal to the outside of the robot 100. The speaker 170 may output multimedia playback, recording playback, various notification sounds, voice messages, etc. The robot 100 may include an audio output device, such as the speaker 170, or may include an output device, such as an audio output terminal. In particular, the speaker 170 may provide acquired information, information processed and produced based on the acquired information, response results on a user's voice, or operation results, etc. in a voice form.

The microphone 180 may receive the user's voice. In particular, the microphone 180 may receive the voice of a user located around the robot 100. In addition, the microphone 180 may convert the input user voice into an electrical signal and transmit the electrical signal to the processor. Accordingly, the processor 130 may identify the number of voice command inputs by a plurality of users 200. Alternatively, the processor 130 may identify whether a plurality of users 200 have a conversation with each other.

The communication interface 190 may transmit or receive various types of content. As one or more examples, the communication interface 190 may receive or transmit signals from or to an external device (e.g., a user terminal), an external storage medium (e.g., a USB memory), or an external server (e.g., a web hard) in a streamlining or downloading manner through a communication method, such as an AP-based wireless LAN network (Wi-Fi), Bluetooth, Zigbee, wired/wireless local area network (LAN), wide area network (WAN), Ethernet, IEEE 1394, high-definition multimedia interface (HDMI), universal serial bus (USB), mobile high-definition link (MHL), audio engineering society/European broadcasting union (AES/EBU), Optical, Coaxial, etc.

In addition, the robot 100 may further include a user interface. The user interface is a component used by the robot 100 to interact with the user, and the processor 130 may receive various information, such as control information of the robot 100, through the user interface, and may calculate an interaction score for each user 200 based on the input information. The user interface may include at least one of a touch sensor, a motion sensor, a button, a jog dial, and a switch, but is not limited thereto.

The methods according to various embodiments of the disclosure described above may be implemented in the form of an application that may be installed on an existing robot. Alternatively, the methods according to various embodiments of the disclosure described above may be performed using a deep learning-based trained neural network (or deep-trained neural network), that is, a learning network model. In addition, the methods according to various embodiments of the disclosure described above may be implemented only by upgrading software or hardware for an existing robot. In addition, the various embodiments of the disclosure described above may also be performed through an embedded server provided in the robot or an external server of the robot.

According to one or more embodiments of the disclosure, the aforementioned various embodiments may be implemented as software including instructions stored in machine-readable storage media, which may be read by machines (e.g., computers). The machines refer to devices that call instructions stored in a storage medium, and may operate according to the called instructions, and the devices may include a display device according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

According to another embodiment, the method according to the various examples disclosed in the disclosure may be included and provided in a computer program product. The computer program product may be traded as a product between a seller and a purchaser. The computer program product may be distributed in a form of a storage medium (for example, a compact disc read only memory (CD-ROM)) that may be read by the machine or may be distributed online through an application store (for example, PlayStore™). In case of the online distribution, at least a portion of the computer program product may be at least temporarily stored in a storage medium, such as a memory of a server of a manufacturer, a server of an application store or a relay server, or be temporarily provided.

Further, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Alternatively or in addition, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

While certain embodiments of the disclosure has been particularly shown and described, it will be understood that various changes in form and details may be made therein without departing from the spirit and scope of the following claims

What is claimed is:

1. A robot comprising:

a camera;

a driver;

at least one memory storing instructions; and at least one processor operatively connected to the camera, the driver, and the at least one memory and configured to execute the instructions to:

recognize at least one person based on an image acquired through the camera, identify a first rotation angle and a first rotation direction of the robot based on a location of at least one target region in which the at least one person is located among a plurality of regions within a field angle of the camera and a first gaze order for the at least one target region, control the driver to rotate the robot based on the first rotation angle and the first rotation direction, based on another person being recognized from the image during rotation of the robot, generate a second gaze order comprising another target region in which the other person is located among the plurality of regions within the field angle of the camera, identify a second rotation angle and a second rotation direction of the robot based on a location of the other target region and the second gaze order, and control the driver to rotate the robot based on the second rotation angle and the second rotation direction.

2. The robot as claimed in claim 1, wherein the at least one processor is further configured to execute the instructions to:

identify the plurality of regions by dividing the field angle of the camera by a predetermined angle, identify, based on the at least one target region being a plurality of target regions, a first target region among the plurality of target regions based on the first gaze order, identify an initial rotation angle and an initial rotation direction of the robot corresponding to the first target region based on a location of the first target region, identify a remaining rotation angle and a remaining rotation direction of the robot corresponding to a remaining target region among the plurality of target regions based on the location of the first target region in previous order of the remaining target region and a location of the remaining target region, and control the driver to rotate the robot according to the first gaze order based on the initial rotation angle, the initial rotation direction, the remaining rotation angle and the remaining rotation direction.

3. The robot as claimed in claim 1, wherein the at least one processor is further configured to execute the instructions to:

identify the plurality of regions by dividing the field angle of the camera by a predetermined angle, and wherein the at least one target region and the other target region are among the plurality of regions.

4. The robot as claimed in claim 3, wherein the at least one processor is further configured to:

based on the at least one target region being a plurality of target regions, identify a next target region next in order to a current target region at which the robot is gazing based on the second gaze order, the plurality of target regions comprising an unattended target region and the other target region, identify a next rotation angle and a next rotation direction of the robot corresponding to the next target region based on a location of the next target region, and identify a remaining rotation angle and a remaining rotation direction of the robot corresponding to a remaining target region after the next target region based on a location of the next target region and a location of the remaining target region.

5. The robot as claimed in claim 4, wherein the at least one processor is further configured to execute the instructions to:

based on the next target region being the other target region, identify the second rotation angle and the second rotation direction based on the location of the other target region, identify a third rotation angle and a third rotation direction of the robot corresponding to the unattended target region based on the location of the other target region, and control the driver to rotate the robot based on the third rotation angle and the third rotation direction after the robot gazes at the new target region.

6. The robot as claimed in claim 4, wherein the at least one processor is further configured to execute the instructions to:

based on the next target region being the unattended target region, identify the second rotation angle and the second rotation direction based on the location of the other target region and a location of the unattended target region coming before the other target region, and control the driver to rotate the robot based on the second rotation angle and the second rotation direction after gazing at the unattended target region before the other target region.

7. The robot as claimed in claim 1, wherein the at least one processor is further configured to execute the instructions to:

based on the rotation angle of the robot for gazing at other new target region being equal to or greater than a predetermined critical angle, maintain the first gaze order without including the other target region in the first gaze order.

8. The robot as claimed in claim 1, wherein the at least one processor is further configured to execute the instructions to:

identify a plurality of first people based on the image acquired through the camera; and identify a plurality of people in a same group among the plurality of first people based on at least one of a distance between the plurality of first people, a time at which the plurality of first people are located within the field angle of the camera, and whether the plurality of first people have a conversation.

9. The robot as claimed in claim 1, further comprising:

a microphone configured to receive a voice, wherein the at least one processor is further configured to execute the instructions to:

based on the at least one person being a plurality of people and the at least one target region being a plurality of target regions, identify gaze durations that the plurality of people gaze at the robot based on the image acquired through the camera, identify a number of voice inputs of the plurality of people for the robot based on the voice acquired through the microphone, calculate interaction scores of the plurality of people based on the gaze durations and the number of voice inputs, identify a regional interaction score corresponding to each target region based on the interaction score of at least one person respectively located in each target region, and determine the first gaze order for the plurality of target regions based on the regional interaction score corresponding to each target region.

10. The robot as claimed in claim 9, wherein the at least one processor is further configured to execute the instructions to:

determine a regional gaze duration for each target region based on the regional interaction score corresponding to each target region; and control the driver to cause the robot to gaze at each target region during the regional gaze duration.

11. A controlling method of a robot, the controlling method comprising:

recognizing at least one person based on an image acquired through a camera;

identifying a first rotation angle and a first rotation direction of the robot based on a location of at least one target region in which the at least one person is located among a plurality of regions within a field angle of the camera and a first gaze order for the at least one target region;

controlling a driver to rotate the robot based on the first rotation angle and the first rotation direction;

based on a another person being recognized from the image during rotation of the robot, generating a second gaze order comprising another target region in which the another person is located among the plurality of regions within the field angle of the camera;

identify a second rotation angle and a second rotation direction of the robot based on a location of the other target region and the second gaze order; and controlling the driver to rotate the robot based on the second rotation angle and the second rotation direction.

12. The controlling method as claimed in claim 11, wherein the identifying of the first rotation angle and the first rotation direction comprises:

identifying the plurality of regions by dividing the field angle of the camera by a predetermined angle;

identifying, based on the at least one target region being a plurality of target regions, a first target region among the plurality of target regions based on the first gaze order;

identifying an initial rotation angle and an initial rotation direction of the robot corresponding to the first target region based on a location of the first target region; and identifying a remaining rotation angle and a remaining rotation direction of the robot corresponding to a remaining target region among the plurality of target regions based on the location of the first target region in previous order of the remaining target region and a location of the remaining target region.

13. The controlling method as claimed in claim 11, wherein the identifying the second rotation angle and the second rotation direction further comprises:

identifying the plurality of regions by dividing the field angle of the camera by a predetermined angle, and wherein the at least one target region and the other target region are among the plurality of regions.

14. The controlling method as claimed in claim 13, wherein the identifying the first rotation angle and the first rotation direction comprises:

based on the at least one target region being a plurality of target regions, identifying a next target region next in order to a current target region at which the robot is gazing based on the second gaze order, the plurality of target regions comprising an unattended target region and the other target region;

identifying a next rotation angle and a next rotation direction of the robot corresponding to the next target region based on a location of the next target region; and identifying a remaining rotation angle and a remaining rotation direction of the robot corresponding to a remaining target region after the next target region based on a location of the next target region and a location of the remaining target region.

15. The controlling method as claimed in claim 14, wherein the identifying the next rotation angle and the next rotation direction comprises based on the next target region being the other target region, identifying the second rotation angle and the second rotation direction based on the location of the other target region, wherein the identifying the remaining rotation angle and the remaining rotation direction comprises identifying a third rotation angle and a third rotation direction of the robot corresponding to the unattended target region based on the location of the other target region, and wherein the controlling the driver to rotate the robot based on the third rotation angle and the third rotation direction comprises controlling the driver to rotate the robot based on the third rotation angle and the third rotation direction after the robot gazes at the other target region.

16. The controlling method as claimed in claim 14, further comprising:

based on the next target region being the unattended target region, identifying the second rotation angle and the second rotation direction based on the location of the other target region and a location of the unattended target region coming before the other target region; and controlling the driver to rotate the robot based on the second rotation angle and the second rotation direction after gazing at the unattended target region before the other target region.

17. The controlling method as claimed in claim 11, further comprising:

based on the rotation angle of the robot for gazing at the other target region being equal to or greater than a predetermined critical angle, maintaining the first gaze order without including the other target region in the first gaze order.

18. The controlling method as claimed in claim 11, further comprising:

identifying a plurality of first people based on the image acquired through the camera; and identifying a plurality of people in a same user group among the plurality of first people based on at least one of a distance between the plurality of first people, a time at which the plurality of first people are located within the field angle of the camera, and whether the plurality of first people have a conversation.

19. The controlling method as claimed in claim 11, further comprising:

based on the at least one user being a plurality of people and the at least one target region being a plurality of target regions, identifying gaze durations that the plurality of people gaze at the robot based on the image acquired through the camera;

identifying a number of voice inputs of the plurality of people for the robot based on a voice acquired through a microphone;

calculating interaction scores of the plurality of people based on the gaze durations and the number of voice inputs;

identifying a regional interaction score corresponding to each target region based on the interaction score of at least one person respectively located in each target region; and determining the first gaze order for the plurality of target regions based on the regional interaction score corresponding to each target region.

20. The controlling method as claimed in claim 19, further comprising:

determining a regional gaze duration for each target region based on the regional interaction score corresponding to each target region; and controlling the driver to cause the robot to gaze at each target region during the regional gaze duration.

* * * * *